United States Patent
Xiong et al.

(10) Patent No.: US 11,146,170 B2
(45) Date of Patent: Oct. 12, 2021

(54) PLURAL STAGES SWITCHING CAPACITOR CONVERTER

(71) Applicant: The University of Hong Kong, Hong Kong (CN)

(72) Inventors: Song Xiong, Hong Kong (CN); Siew Chong Tan, Hong Kong (CN); Shu Yuen Ron Hui, Hong Kong (CN)

(73) Assignee: The University of Hong Kong, Hong Kong (CN)

( * ) Notice: Subject to any disclaimer, the term of this patent is extended or adjusted under 35 U.S.C. 154(b) by 0 days.

(21) Appl. No.: 15/546,574

(22) PCT Filed: Feb. 27, 2015

(86) PCT No.: PCT/CN2015/073371
§ 371 (c)(1),
(2) Date: Jul. 26, 2017

(87) PCT Pub. No.: WO2016/134527
PCT Pub. Date: Sep. 1, 2016

(65) Prior Publication Data
US 2018/0026528 A1    Jan. 25, 2018

(51) Int. Cl.
*H02M 3/07* (2006.01)
*H02M 3/158* (2006.01)
*H02M 1/00* (2006.01)

(52) U.S. Cl.
CPC ............ *H02M 3/07* (2013.01); *H02M 3/158* (2013.01); *H02M 1/007* (2021.05); *H02M 1/0093* (2021.05)

(58) Field of Classification Search
CPC ......... H02M 3/07; H02M 3/072; H02M 3/158
(Continued)

(56) References Cited

U.S. PATENT DOCUMENTS 6,920,055 B1 *   7/2005   Zeng .................. H02M 3/07
                                                    363/59
7,382,113 B2     6/2008   Wai et al.
(Continued)

FOREIGN PATENT DOCUMENTS

CN    1286522 A     3/2001
CN    104253548 A   12/2014
(Continued)

OTHER PUBLICATIONS

International Search Report in International Application No. PCT/CN2015/073371, filed Feb. 27, 2015.
(Continued)

*Primary Examiner* — Alex Torres-Rivera
(74) *Attorney, Agent, or Firm* — Saliwanchik, Lloyd & Eisenschenk

(57) ABSTRACT

A power converter comprising one or more switch blocks. Each switch block has: a plurality of switch-pairs each having two switches connected in series to each other; a plurality of primary nodes each interconnecting the switches in a respective switch-pair; and a plurality of secondary nodes, each switch-pair being connected in series to an adjacent switch-pair through a said secondary node to form a serial chain of switch-pairs, the secondary nodes including a secondary node at one end of said serial chain and a secondary node at another end of said serial chain. Each adjacent pair of said primary nodes is connectable to a flying capacitor. Each pair of said secondary nodes is connectable to one or more of the following: one or more bypass capacitors, and one or more other said switch blocks. The power converter further comprises a first terminal formed by any two of the secondary nodes in any one of the switch blocks, and a second terminal formed by any two of the secondary nodes in any one of the switch blocks.

26 Claims, 40 Drawing Sheets

(58) Field of Classification Search
USPC .................................... 363/59, 60; 323/271
See application file for complete search history.

(56) References Cited

U.S. PATENT DOCUMENTS

| | | | |
|---|---|---|---|
| 7,696,735 B2 | 4/2010 | Oraw et al. | |
| 7,746,041 B2 | 6/2010 | Xu et al. | |
| 8,089,788 B2 | 1/2012 | Jain | |
| 8,199,540 B2 | 6/2012 | Leu et al. | |
| 8,259,476 B2 | 9/2012 | Ben-Yaakov et al. | |
| 8,395,438 B2 | 3/2013 | Dennard et al. | |
| 8,537,579 B2 | 9/2013 | Ripley et al. | |
| 8,861,233 B2 | 10/2014 | Marsili et al. | |
| 2008/0239772 A1* | 10/2008 | Oraw ...................... | H02M 3/07 363/60 |
| 2009/0261793 A1* | 10/2009 | Urakabe ............... | H02M 3/158 323/282 |
| 2010/0080023 A1* | 4/2010 | Jain ......................... | H02M 3/07 363/65 |
| 2011/0292690 A1 | 12/2011 | Liang et al. | |
| 2014/0239719 A1* | 8/2014 | Kumar .................... | H02M 3/07 307/31 |
| 2015/0009734 A1* | 1/2015 | Stahl ...................... | H02M 7/483 363/98 |
| 2015/0155895 A1* | 6/2015 | Perreault .............. | H04B 1/0458 323/271 |
| 2015/0188362 A1* | 7/2015 | Mondal ................. | H02M 3/156 307/52 |
| 2015/0263612 A1* | 9/2015 | Wu ......................... | H02M 3/07 323/312 |
| 2017/0229955 A1* | 8/2017 | Schober ................. | H02M 3/07 |
| 2017/0338735 A1* | 11/2017 | Alarcon-Cot ....... | H02M 1/4225 |

FOREIGN PATENT DOCUMENTS

| | | |
|---|---|---|
| JP | S6481669 A | 3/1989 |
| JP | H0731144 A | 1/1995 |
| JP | 2009-201231 A | 9/2009 |
| KR | 10-2009-0123231 A | 12/2009 |
| WO | WO-2010/006479 A1 | 1/2010 |

OTHER PUBLICATIONS

Renewable Energy Scenario to 2040, Half of the Global Energy Supply from Renewables, European Renewable Energy Council, 26, rue du Trone—1000 Brussels, 16 pages, http://www.erec.org/media/publications/2040-scenario.html.

Li, Weichen et al., Interleaved High Step-Up ZVT Converter With Built-In Transformer Voltage Doubler Cell for Distributed PV Generation System, IEEE Transactions on Power Electronics, Jan. 2013, 28(1):300-313, 2012 IEEE.

Chen, Yen-Mo et al., A High Step-Up Three-Port DC-DC Converter for Stand-Alone PV/Battery Power Systems, IEEE Transactions on Power Electronics, Nov. 2013, 28(11):5049-5062, 2013 IEEE.

Laird, Ian et al., High Step-Up DC/DC Topology and MPPT Algorithm for Use With a Thermoelectric Generator, IEEE Transactions on Power Electronics, Jul. 2013, 28(7):3147-3157, 2012 IEEE.

Barreto, Luiz Henrique S. C. et al., High-Voltage Gain Boost Converter Based on Three-State Commutation Cell for Battery Charging Using PV Panels in a Single Conversion Stage, IEEE Transactions on Power Electronics, Jan. 2014, 29(1):150-158, 2013 IEEE.

Li, Wuhua et al., Review of Nonisolated High-Step-Up DC/DC Converters in Photovoltaic Grid-Connected Applications, IEEE Transactions on Industrial Electronics, Apr. 2011, 58(4):1239-1250, 2010 IEEE.

Hwu, K.I. et al., An Interleaved AC-DC Converter Based on Current Tracking, IEEE Transactions on Industrial Electronics, May 2009, 56(5):1456-1463, 2009 IEEE.

Franceschini, Giovanni et al., 3boost: A High-Power Three-Phase Step-Up Full-Bridge Converter for Automotive Applications, IEEE Transactions on Industrial Electronics, Jan. 2008, 55(1):173-183, 2008 IEEE.

Stein, Carlos Marcelo De Oliveira et al., A ZCT Auxiliary Commutation Circuit for Interleaved Boost Converters Operating in Critical Conduction Mode, IEEE Transactions on Power Electronics, Nov. 2002, 17(6):954-962, 2002 IEEE.

Kwon, Jung-Min et al., High Step-Up Active-Clamp Converter With Input-Current Doubler and Output-Voltage Doubler for Fuel Cell Power Systems, IEEE Transactions on Power Electronics, Jan. 2009, 24(1):108-115, 2008 IEEE.

Zhu, Lizhi, A Novel Soft-Commutating Isolated Boost Full-Bridge ZVS-PWM DC-SC Converter for Bidirectional High Power Applications, IEEE Transactions on Power Electronics, Mar. 2006, 21(2):422-429, 2006 IEEE.

Yoon, Changwoo et al., Multiphase DC-DC Converters Using a Boost-Half-Bridge Cell for High-Voltage and High-Power Applications, IEEE Transactions on Power Electronics, Feb. 2011, 26(2):381-388, 2010 IEEE.

Peng, Fang Zheng et al., A Compact nX DC-DC Converter for Photovoltaic Power Systems, Sep. 2013, pp. 4780-4784, 2013 IEEE.

Tezuka, Y. et al., A Low Power DC-DC Converter Using a Switched-Capacitor Transformer, Oct. 1983, pp. 261-268, 1983 IEEE.

Oraw, Bradley et al., Load Adaptive, High Efficiency, Switched Capacitor Intermediate Bus Converter, Oct. 2007, pp. 628-635, 2007 IEEE.

Makowski, Marek S. et al., Performance Limits of Switched-Capacitor DC-DC Converters, Jun. 1995, pp. 1215-1221, 1995 IEEE.

Kushnerov, Alexander et al., Algebraic Synthesis of Fibonacci Switched Capacitor Converters, Power Electronics Laboratory, Nov. 2011, pp. 1-4.

Umeno, Tohru et al., New Switched-Capacitor DC-DC Converter With Low Input Current Ripple and its Hybridization, Aug. 1990, pp. 1091-1094, 1991 IEEE.

Xiong, Song et al., A Family of Exponential Step-Down Switched-Capacitor Converters and Their Applications in Two-Stage Converters, IEEE Transactions on Power Electronics, Apr. 2014, 29(4):870-1880, 2013 IEEE.

Jain, Rinkle, A Novel Switched Capacitor Circuit for Efficient Voltage Regulation, Proceedings of the 7th International Caribbean Conference on Devices, Circuits and Systems, Apr. 2008, pp. 1-6, 2008 IEEE, Mexico.

Extended European Search Report dated Sep. 17, 2018 in European Application No. 15882965.5.

Filsoof, K. et al., "Design and Control of a Bidirectional Triangular Modular Multilevel DC-DC Converter", *2013 IEEE 14th Workshop on Control and Modeling for Power Electronics (COMPEL)*, 2013, 7 pages, IEEE.

* cited by examiner

Prior Art

Prior Art

PLURAL STAGES SWITCHING CAPACITOR CONVERTER

CROSS-REFERENCE TO RELATED APPLICATION

This application is the U.S. national stage application of International Patent Application No. PCT/CN2015/073371, filed Feb. 27, 2015, the disclosure of which is incorporated herein by reference in its entirety.

FIELD OF THE INVENTION

The present invention is related to power converters and power conversion methods, and in particular, DC/DC power converters and DC/DC power conversion methods. The present invention has been described herein primarily in relation to high voltage gain power conversion, but is not limited to this particular application.

BACKGROUND OF THE INVENTION

The massive usage of fossil fuels has led to severe environmental pollution and greenhouse effect. Increasing the utilization of renewable energy is an urgent endeavor for our sustainable development. Generally, the output of common devices in distributed energy resource (DER) systems [1], which include photovoltaic (PV) arrays, thermoelectric generators (TEG), fuel cells, and battery storage elements, are of DC voltages that are of a relatively low level as compared to the required voltage level of power grids [2][4]. These devices are connected to the power grids through high-voltage-gain boost DC/DC converters that are cascaded with DC/AC inverters [2][5] (see FIG. 1). To achieve the grid-level voltage, the inverters DC-link input voltage is always designed in the range from 200 V to 400 V [5]. Hence, a high-voltage-gain DC/DC converter is required [3], [5].

Throughout this specification, reference is made to the citations listed at the end of the description. Each citation is listed against a corresponding number in square brackets [n] and said number in square brackets is cited where reference is made to the corresponding citation in this specification.

Theoretically, a boost converter on its own can achieve a high-voltage-gain conversion M by increasing the duty ratio D, i.e., $M=1/(1-D)$. However, for such conversion, the parasitic resistance and the leakage inductance of the inductor will degrade the converter's efficiency, and practically limit the overall achievable gain M to a small value [6]-[9]. Moreover, with a converter working at an extremely high duty ratio, the input current ripple will be significantly increased. The high current ripple also increases the switching losses. Furthermore, the switch and the diode of the converter suffer from high voltage stress, which mandates the need for better components. High voltage stress also leads to high switching and reverse-recovery losses of the switch and diode [6]. Extreme high duty ratio also deteriorates the transient performance of the boost converter due to the limited room for duty ratio adjustment in handling the transient changes. Therefore, the application of boost converters for high-voltage-gain conversion is highly limited.

In order to avoid an extremely high duty ratio and its related issues due to high gain operations, isolated converters with transformer is an alternative [10][15]. Converters with transformer, such as the phase-shift full-bridge converters, can easily achieve ultra-high-voltage-gain conversion by adjusting the transformer's turns' ratio and operating the duty ratio at a pre-optimized range. However, the converter's efficiency can be low due to the high loss caused by high voltage stress in the diode and the leakage inductance of the transformer [6]. As the leakage inductor is a significant source of power wastage, techniques with active-clamped circuits are applied to recycle the energy of the leakage inductor to improve the converter's efficiency [10], [11]. Nevertheless, this comes at the expense of complicating the start-up operation and a higher setup cost due to the use of expensive components such as isolation sensors and feedback controller [6]. Also, for converters with transformer, the weight, size, and cost of the magnetic must be accounted. Hence, with DERs that do not require the use of transformer isolation for protection, it is preferred to avoid using converters with transformer.

Besides, magnetic-based converters are unsuitable for application in a high temperature environment as the permeability can decrease significantly as temperature increases. This will further lead to increased power loss of the converter and the loss would further step up the temperature [16]. Moreover, it is required that some DERs are functional in the high temperature environment. Such DER includes the PV arrays and TEGs. Thus, it is preferable to apply magnetic-less converters in PV and TEG systems, especially those operating in the high temperature environment.

The switched-capacitor (SC) converter is composed of only switches and capacitors. It is a magnetic-less converter that is well known for its light weight and high efficiency. However, SC converters suffer from having poor regulation. Typically, there are two approaches of connecting the DERs to the grid. One approach is to have the DERs output voltage stepped up to a regulated DC voltage, and then having the inverter converts the DC voltage into an AC voltage for grid connection. The second approach is to first step up the DER's output voltage to an unregulated DC voltage, and then having the inverter perform both voltage conversion and regulation [16]. If the SC converter is adopted in the DER system, the second approach will be adopted.

There are many types of SC converters. The series-parallel SC converter is of high efficiency, simple to control, and good for extension. However, it requires too many components when used in the high-voltage-conversion application [17] (see FIG. 2). Ladder type SC converter is also of high efficiency and low input current ripple [18], [19] (see FIG. 3). However, it also needs a large number of switches and capacitors in high-voltage-conversion applications. Fibonacci SC converters [20], [21] (see FIG. 4) and exponential SC converters [22][24] require fewer components for the same type of conversion. However, the voltage conversion ratio is rigid and not continually incremental, which limits its potential application in DERs. Paper [16] proposed an N-time step up SC converter which uses minimal components and allows a flexible conversion ratio (see FIG. 5). However, the voltage stress of the capacitors and switches of this topology is high. Paper [25] and patent [26] proposed a series of reconfigurable SC converters. However, some of the switches require bidirectional voltage block, which increases the number of switches. Furthermore, it also will increase the voltage stress of the switches (see FIG. 6).

It is an object of the present invention to overcome or ameliorate at least one of the disadvantages of the prior art, or to provide a useful alternative.

SUMMARY OF THE INVENTION

The present invention provides a power converter comprising:
one or more switch blocks each having:
a plurality of switch-pairs each having two switches connected in series to each other;
a plurality of primary nodes each interconnecting the switches in a respective switch-pair; and
a plurality of secondary nodes, each switch-pair being connected in series to an adjacent switch-pair through a said secondary node to form a serial chain of switch-pairs, the secondary nodes including a secondary node at one end of said serial chain and a secondary node at another end of said serial chain;
each adjacent pair of said primary nodes connectable to a flying capacitor; and
each pair of said secondary nodes connectable to one or more of the following: one or more bypass capacitors, and one or more other said switch blocks;
the power converter further comprising:
a first terminal formed by any two of the secondary nodes in any one of the switch blocks; and
a second terminal formed by any two of the secondary nodes in any one of the switch blocks.

In some embodiments, the power converter comprises a plurality of said switch blocks, one defining a first-stage switch block and the others defining nth-stage switch blocks with two secondary nodes of each nth-stage switch block connected to two secondary nodes of one or more earlier stage switch blocks.

In one embodiment, the first terminal is a low voltage terminal connected to any two secondary nodes of the first-stage switch block. In another embodiment, the first terminal is a low voltage terminal connected to two adjacent secondary nodes of the first-stage switch block.

In one embodiment, the second terminal is a high voltage terminal connected to a secondary node of the first-stage switch block and to a secondary node of the last nth-stage switch block.

In one embodiment, the power converter comprises two of said switch blocks, one defining a first-stage switch block and the other defining a second-stage switch block with two secondary nodes of the second-stage switch block connected to two secondary nodes of the first-stage switch block.

In one embodiment, the power converter comprises a third switch block defining a third-stage switch block with two secondary nodes of the third-stage switch block connected to two secondary nodes of the second-stage switch block. In another embodiment, the power converter comprises a third switch block defining a third-stage switch block with one secondary node of the third-stage switch block connected to one secondary node of the second-stage switch block and another secondary node of the third-stage switch block connected to one secondary node of the first-stage switch block.

In one embodiment, the power converter is configured to convert a first voltage at the first terminal to a second voltage at the second terminal at a desired conversion ratio. In some embodiments, the conversion ratio is fractional.

In some embodiments, the power converter comprises one or more reconfiguration switches connected to one or more switch blocks such that the conversion ratio is variable in real-time, the power converter thereby being reconfigurable.

Throughout this specification, including the claims, the terms "comprise", "comprising", and other like terms are to be construed in an inclusive sense, that is, in the sense of "including, but not limited to", and not in an exclusive or exhaustive sense, unless explicitly stated otherwise or the context clearly requires otherwise.

BRIEF DESCRIPTION OF THE FIGURES

Preferred embodiments in accordance with the best mode of the present invention will now be described, by way of example only, with reference to the accompanying figures, in which.

DETAILED DESCRIPTION OF EMBODIMENTS OF THE INVENTION

Figure 1:
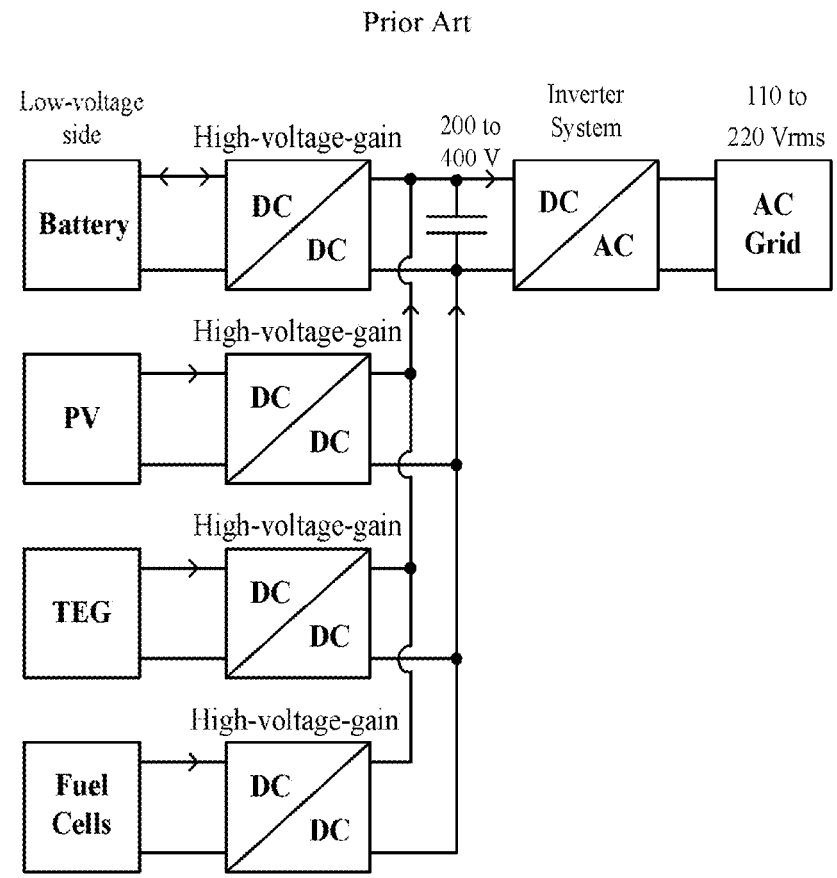
FIG. 1 is a schematic diagram of a prior grid-connected single-phase distributed energy resource (DER) system.
Figure 2:
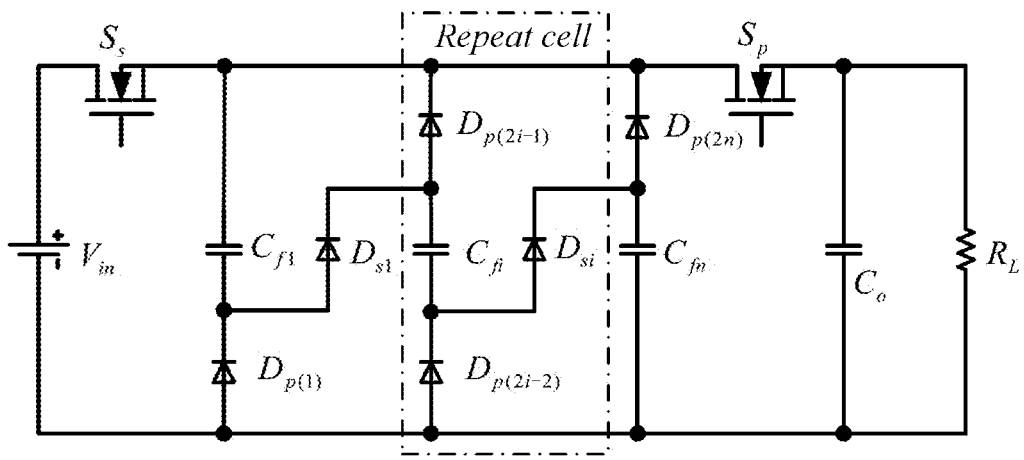
FIG. 2 is a schematic diagram of a prior series-parallel switched-capacitor (SC) converter.
Figure 3:
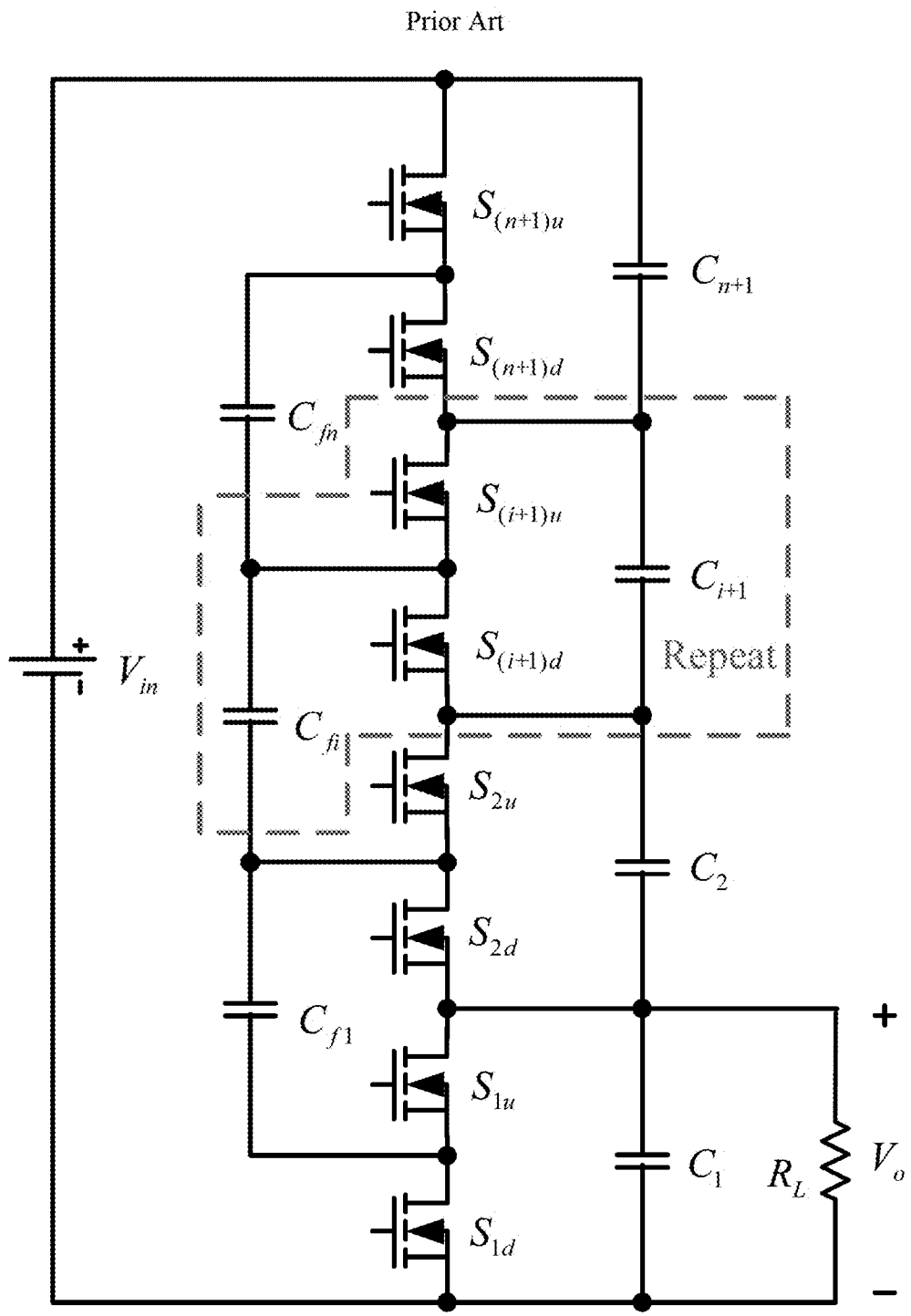
FIG. 3 is a schematic diagram of a prior ladder-type switched-capacitor (SC) converter, as per [18] and [19]
Figure 4:
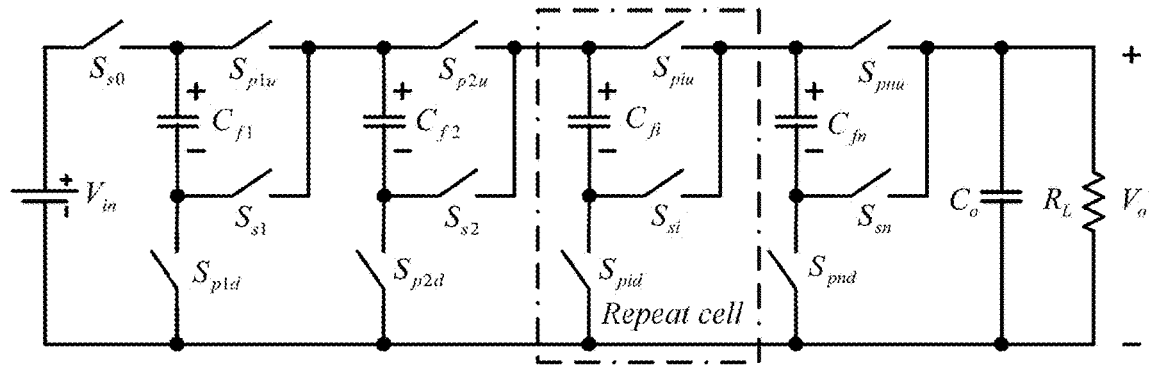
FIG. 4 is a schematic diagram of a prior Fibonacci switched-capacitor (SC) converter, as per [20] and [21]
Figure 5:
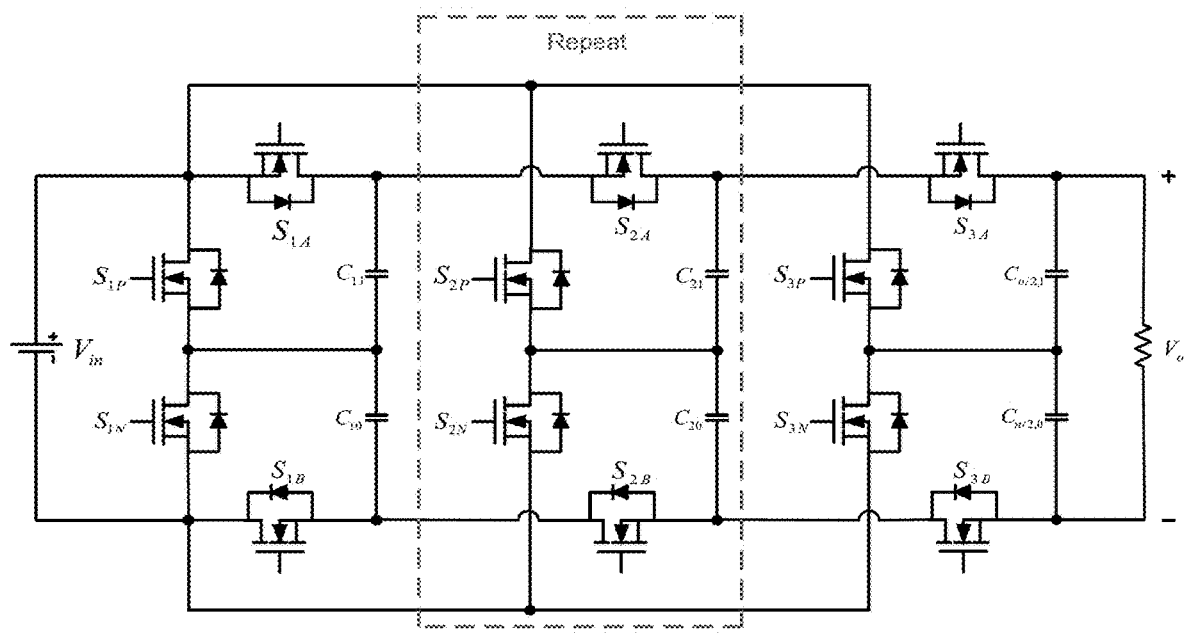
FIG. 5 is a schematic diagram of a prior N x step-up switched-capacitor (SC) converter, as per [16]
Figure 6A:
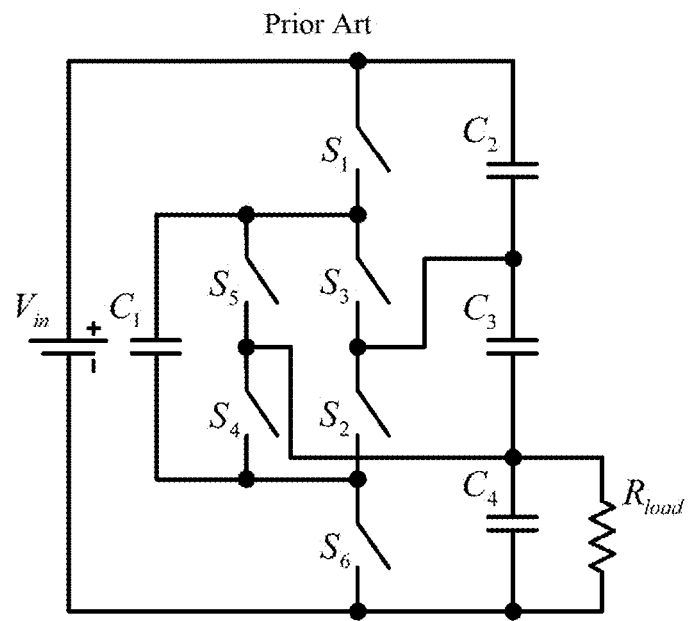
FIG. 6(a) is a schematic diagram of a prior reconfigurable switched-capacitor (SC) converter, as per [25] and [26]
Figure 6B:
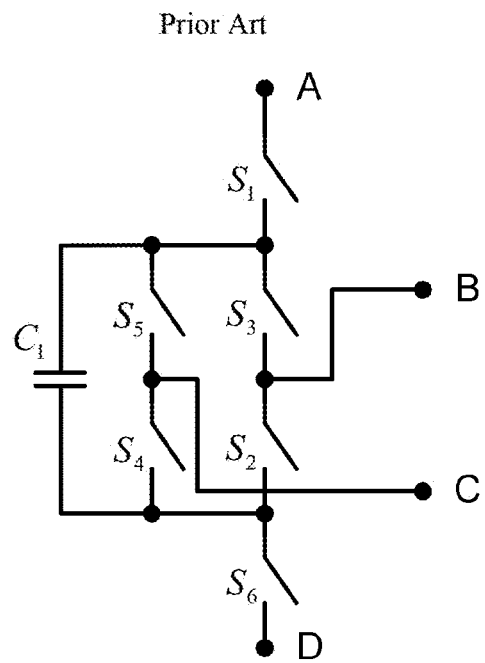
FIG. 6(b) is a basic block diagram of the prior reconfigurable switched-capacitor (SC) converter of FIG. 6(a), as per [25] and [26]

Referring to the accompanying figures, there is provided a power converter comprising one or more switch blocks. Each switch block has a plurality of switch-pairs each having two switches connected in series to each other. In the figures, each switch is labeled $S_{xya}$. Subscript a is a letter, and the letter is the same for each of the two switches that form a switch-pair. Subscript y is a number differentiating one switch from the other in a switch-pair. Subscript x is a number denoting the switch block.

Each switch block further comprises a plurality of primary nodes each interconnecting the switches in a respective switch-pair. In the figures, each primary node is labeled as $X_p$ with the subscript p being a number differentiating each primary node from the other primary nodes.

Each switch block also comprises a plurality of secondary nodes. Each switch-pair is connected in series to an adjacent switch-pair through a said secondary node to form a serial chain of switch-pairs, with the secondary nodes including a secondary node at one end of said serial chain and a secondary node at another end of said serial chain. In the figures, each secondary node is labeled as $Y_p$ with the subscript p being a number differentiating each secondary node from the other secondary nodes.

In the figures, the primary and secondary nodes are also labeled $NA_q$ where A is a letter denoting the switch block and the subscript q is a number with even numbers designating the primary nodes and odd numbers designating the secondary nodes.

Each adjacent pair of said primary nodes is connectable to a flying capacitor. A flying capacitor is labeled as $C_{fxa}$ in the figures, where subscript x is a number denoting the switch block to which the flying capacitor is connected, and subscript a is a letter differentiating one flying capacitor from another connected to the switch block.

Each pair of said secondary nodes is connectable to one or more of the following: one or more bypass capacitors, and one or more other said switch blocks. A bypass capacitor is labeled as $C_{xya}$ in the figures, where subscript x is a number denoting the switch block to which the bypass capacitor is connected. Subscript y is a number and subscript a is a letter with both differentiating one bypass capacitor from another connected to the switch block.

The power converter further comprises a first terminal formed by any two of the secondary nodes in any one of the switch blocks, and a second terminal formed by any two of the secondary nodes in any one of the switch blocks. In some of the embodiments shown in the figures, the first terminal is a low voltage terminal $V_L$, and the second terminal is a high voltage terminal $V_H$. The power converter converts a low voltage at the low voltage terminal $V_L$ to a high voltage at the high voltage terminal $V_H$, or vice versa. In other embodiments shown in the figures, the first terminal is an input terminal $V_{in}$, and the second terminal is an output terminal $V_o$. It will be appreciated that the input terminal $V_{in}$ can be a low voltage terminal $V_L$, and the output terminal V, can be a high voltage terminal $V_H$, or vice versa.

The power converter comprises a plurality of said switch blocks described above, one defining a first-stage switch block and the others defining nth-stage switch blocks with two secondary nodes of each nth-stage switch block connected to two secondary nodes of one or more earlier stage switch blocks.

For example, in the embodiments shown in FIG. 16, the power converter comprises two of said switch blocks, one defining a first-stage switch block and the other defining a second-stage switch block with two secondary nodes of the second-stage switch block connected to two secondary nodes of the first-stage switch block.

Figure 17A:
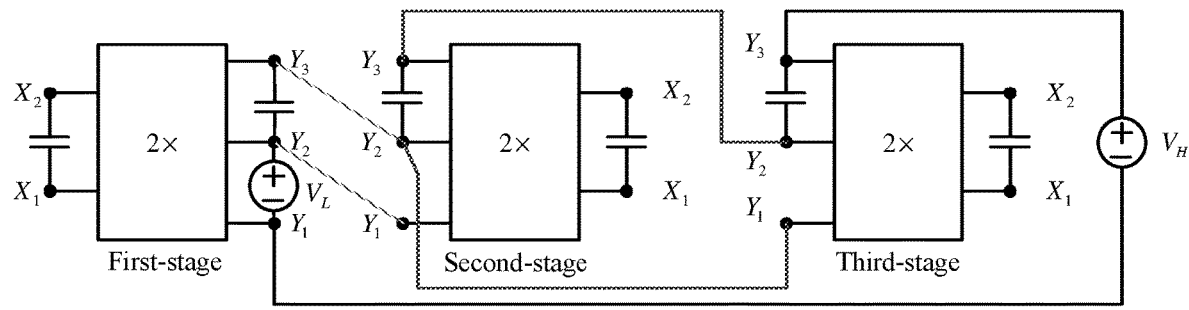
FIGS. 17(a) to (f) are schematic block diagrams of three-stage SC converters in accordance with embodiments of the present invention, with each stage of each converter based on a two-time switch block, and with the converters of FIGS. 17(a) to 17(f) providing conversion ratios of 4, 5, 6, 6, 7, and 8 respectively.
Figure 17B:
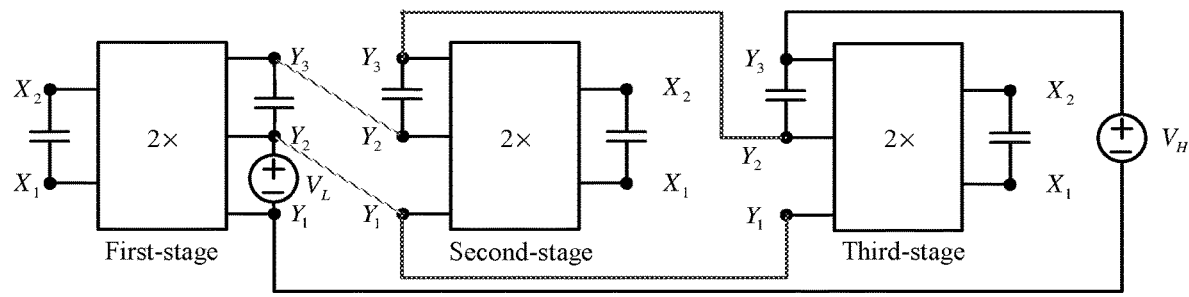
Figure 17C:
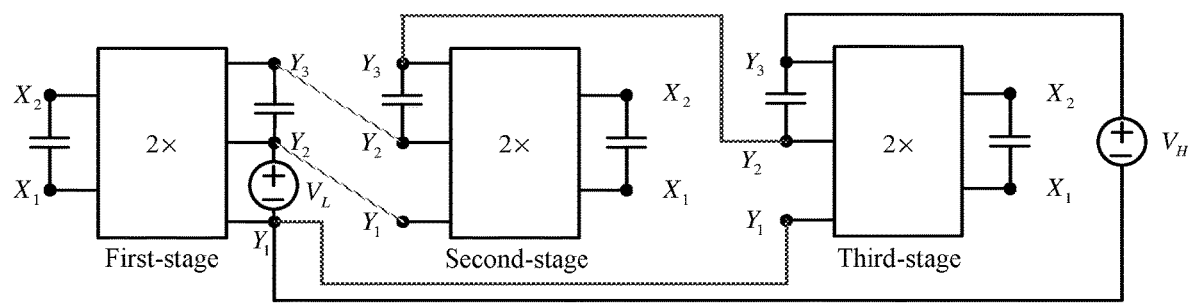
Figure 17D:
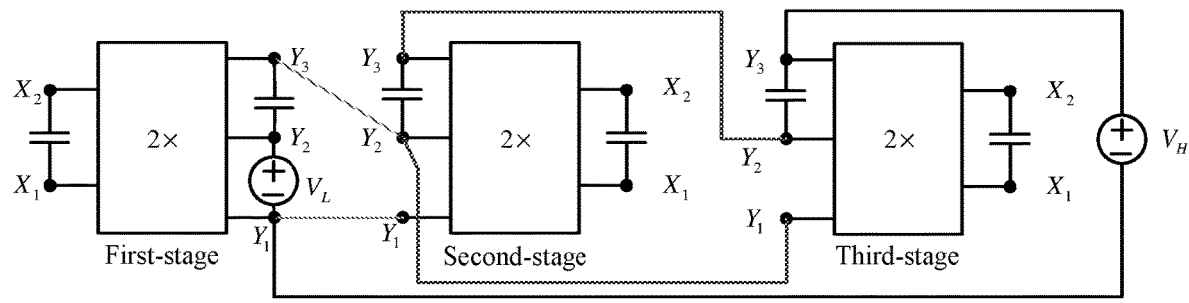
Figure 17E:
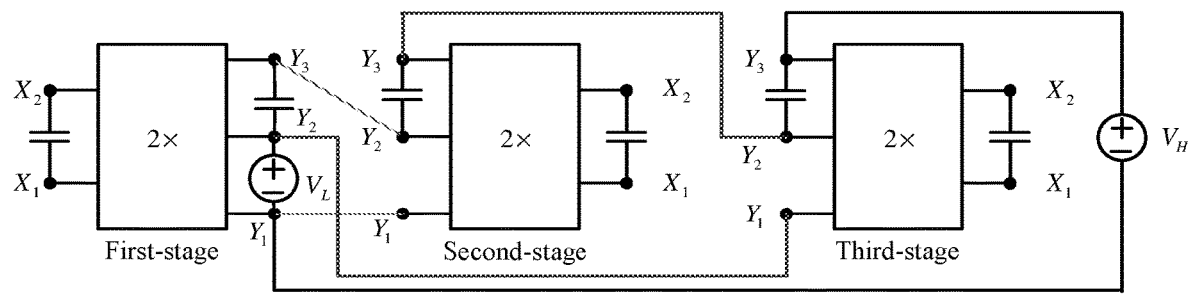
Figure 17F:
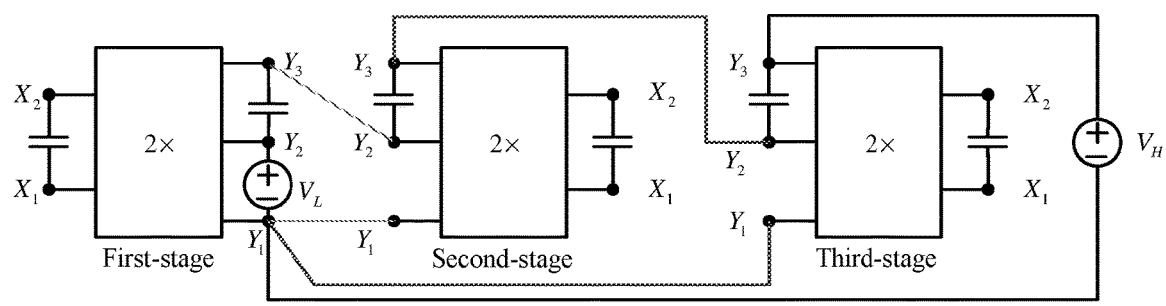

FIGS. 17(a), (b), and (d) show embodiments where the power converter comprises a third switch block defining a third-stage switch block with two secondary nodes of the third-stage switch block connected to two secondary nodes of the second-stage switch block. FIGS. 17(c), (e), and (f)

show embodiments where the power converter comprises a third switch block defining a third-stage switch block with one secondary node of the third-stage switch block connected to one secondary node of the second-stage switch block and another secondary node of the third-stage switch block connected to one secondary node of the first-stage switch block.

Figure 22A:
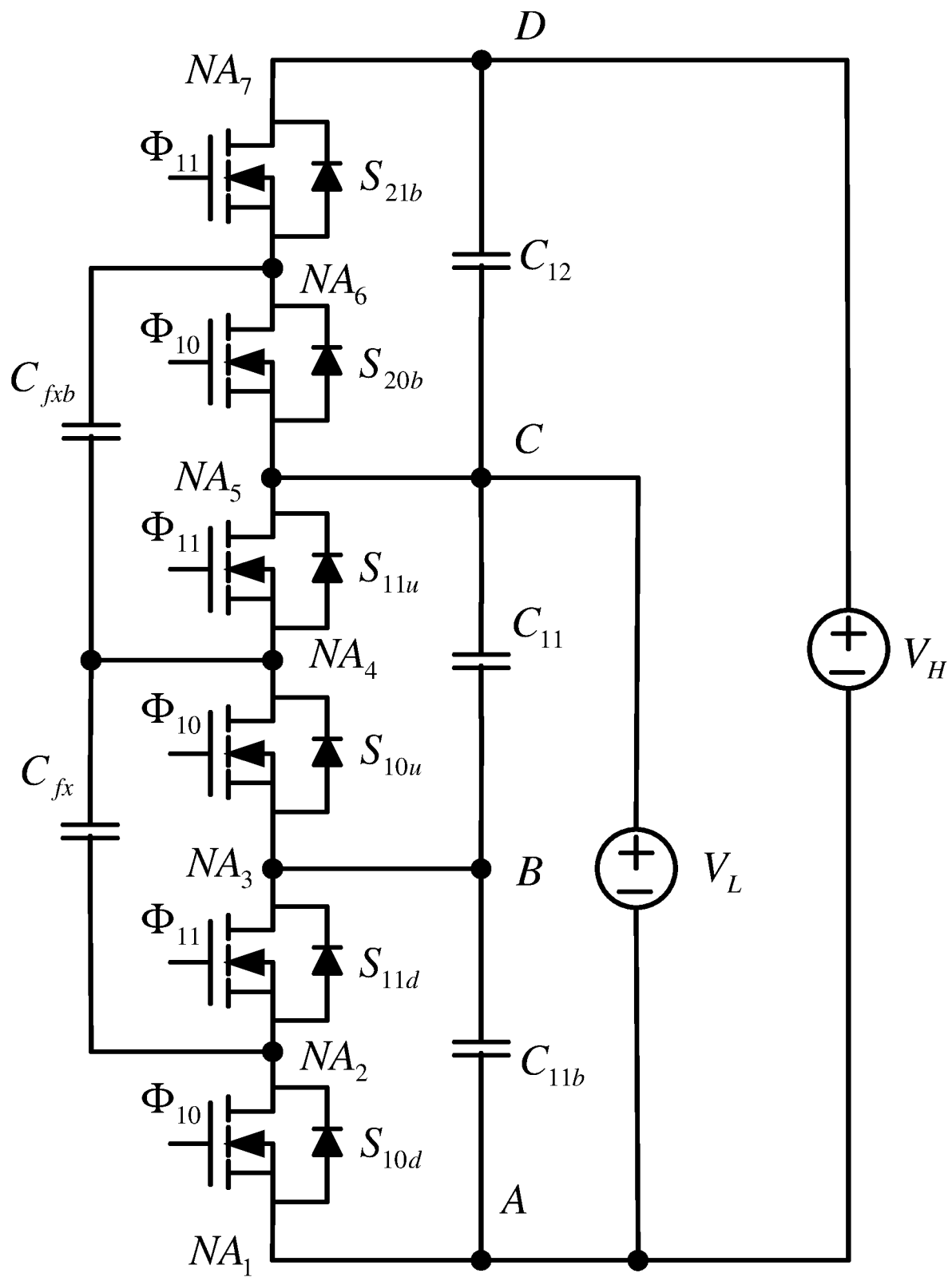
FIGS. 22(a) to (c) are schematic block diagrams of SC converters in accordance with embodiments of the present invention, with the converter of FIG. 22(a) providing a conversion ratio of 3/2 or 2/3, the converter of FIG. 22(b) providing a conversion ratio of 5/2 or 2/5, and the converter of FIG. 22(c) providing a conversion ratio of 7/2 or 2/7.

The first terminal can be a low voltage terminal $V_L$ connected to any two secondary nodes of the first-stage switch block. In some embodiments, the first terminal is a low voltage terminal connected to two adjacent secondary nodes of the first-stage switch block. For example, FIGS. 16, 17, and 19 show the first terminal as a low voltage terminal $V_L$ connected to the first two adjacent secondary nodes of the first-stage switch block. FIG. 22(a) on the other hand shows the first terminal as a low voltage terminal $V_L$ connected to the first and third secondary nodes.

The second terminal can be a high voltage terminal $V_H$ connected to a secondary node of the first-stage switch block and to a secondary node of the last nth-stage switch block.

The power converter is configured to convert a first voltage at the first terminal to a second voltage at the second terminal at a desired conversion ratio. The conversion ratio can be represented as M where the second voltage is the first voltage multiplied by a factor of M. M can be an integer (e.g. 2, 3, 4, . . . ). However, M can also be fractional. Accordingly, in general, $$M = \frac{m}{n} \text{ or } M = \frac{n}{m},$$

where m and n are integers and m<n.

Figure 23A:
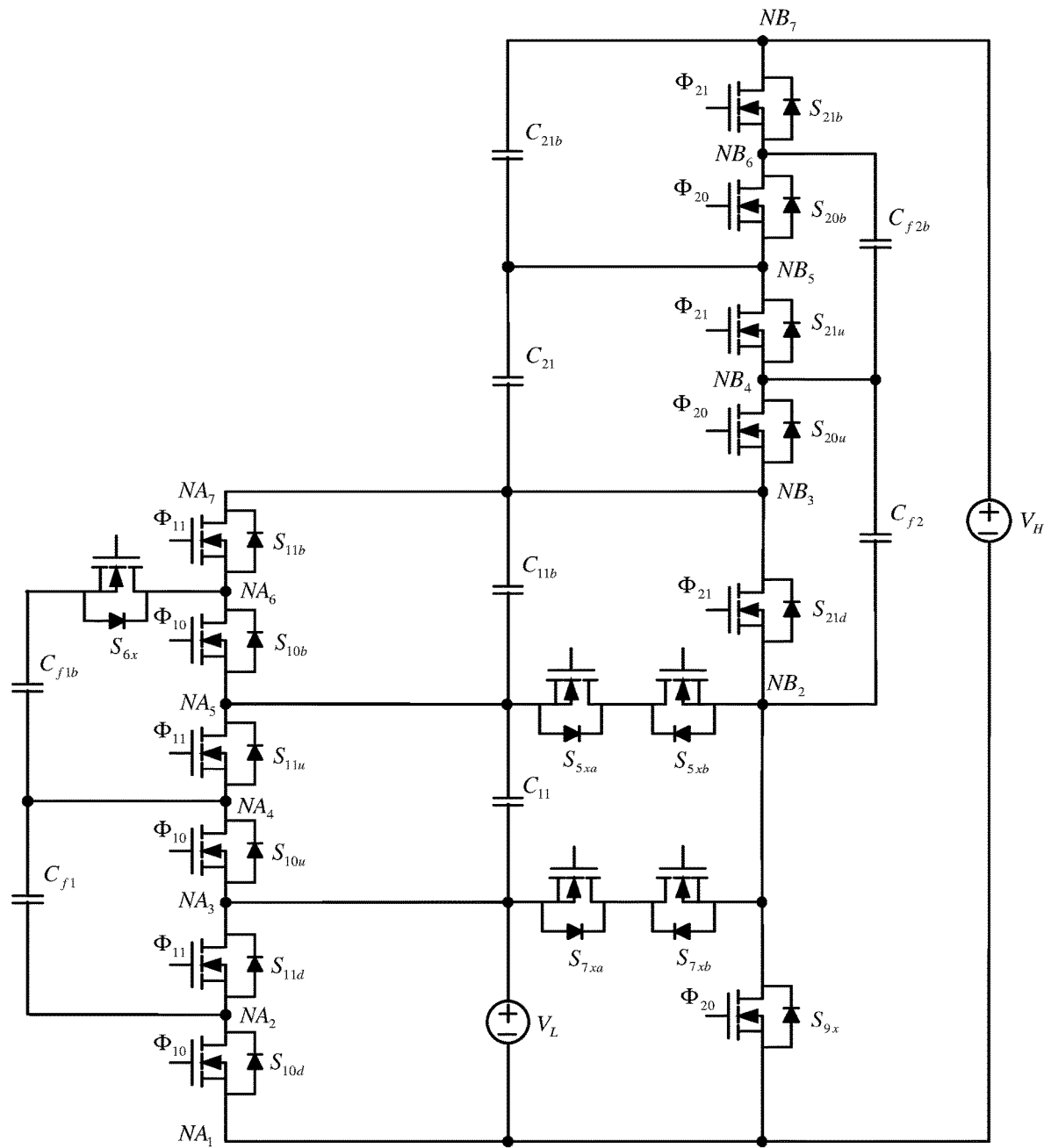
FIGS. 23(a) to (b) are schematic block diagrams of reconfigurable SC converters in accordance with embodiments of the present invention.

The power converter can also comprise one or more reconfiguration switches connected to one or more switch blocks such that the conversion ratio is variable in real-time, the power converter thereby being reconfigurable. In FIG. 23(a), five reconfiguration switches $S_{5xa}$, $S_{5xb}$, $S_{6x}$, $S_{7xa}$, and $S_{7xb}$ are shown. FIG. 23(b) is the power converter shown in FIG. 23(a) but with the addition of further reconfiguration switches $S_1$, $S_{2a}$, $S_{2b}$, $S_{3a}$, $S_{3b}$, and $S_4$.

The power converter is also termed an "SC converter" or an "SC structure" throughout this specification, with the "SC" referring to the switched capacitor structure of the converter. An "M-time SC converter" or an "M-time SC structure" is a power converter that provides a conversion ratio of M. Similarly, an "N×SC converter" or an "N-time SC converter" is a power converter that provides a conversion ratio of N. For example, a "two-time SC structure" is a power converter that provides an output voltage that is the input voltage multiplied by a factor of 2. An "$\frac{m}{n}$-time SC structure"

is a power converter that provides an output voltage that is the input voltage multiplied by a factor of $\frac{m}{n}$.

Switch blocks as described above are also termed as "basic blocks", "basic structures", or "basic SC structures" throughout this specification. A switch block can also be qualified by the number of switch-pairs the switch block contains, and therefore the conversion ratio the switch block itself can provide. For example, a "basic two-time SC structure" is a switch block with two switch-pairs to provide a conversion ratio of 2, and a "basic three-time structure" is a switch block with three switch-pairs to provide a conversion ratio of 3.

Both the power converter and the switch blocks can be termed "bidirectional" since input and output terminals can be reversed to provide step-up and step-down between the input and output terminals.

Figure 7A:
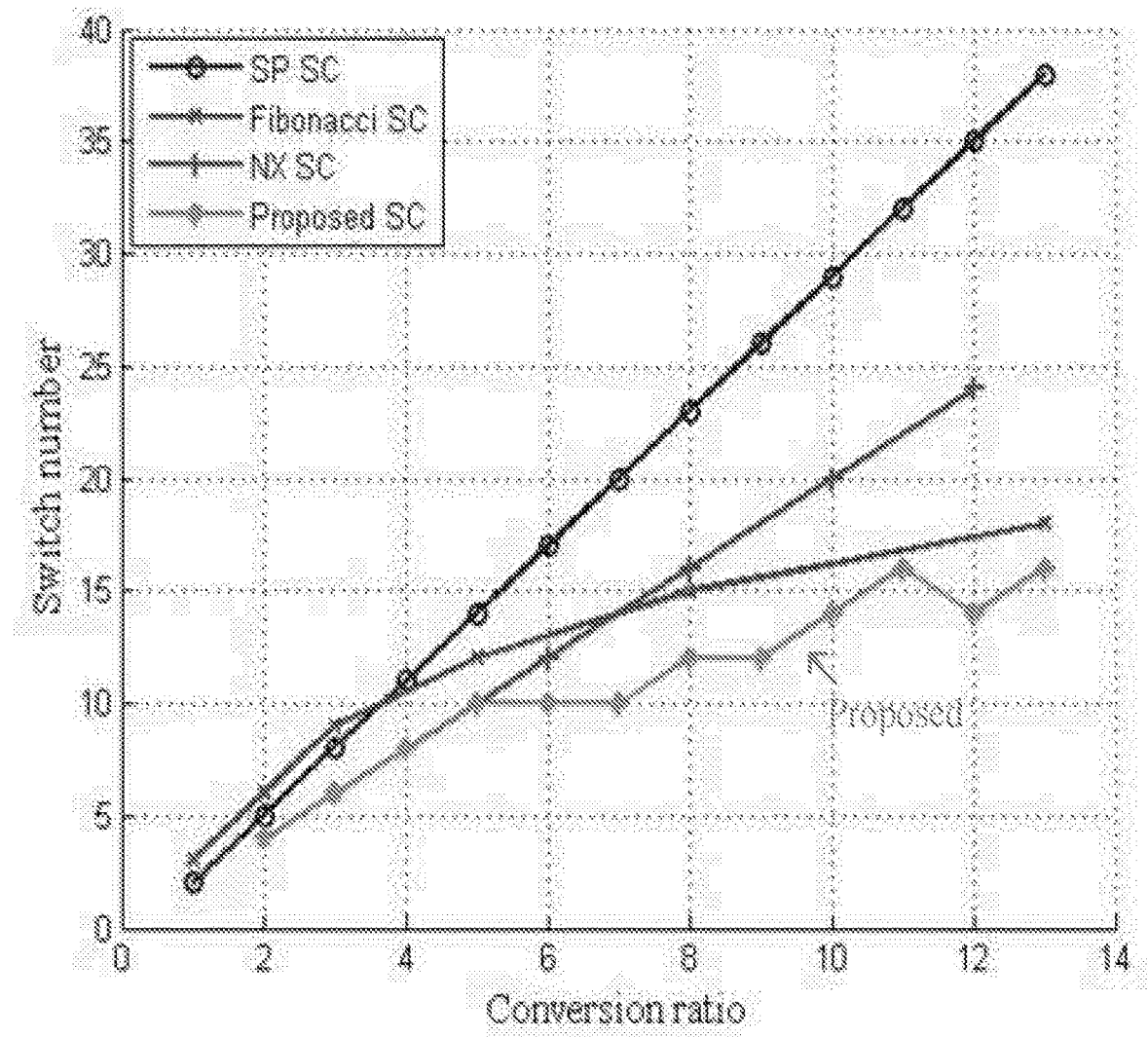
FIG. 7(a) is a graph comparing switch numbers of a series-parallel SC converter, a Fibonacci SC converter, a N×SC converter, and a proposed SC converter in accordance with an embodiment of the present invention.
Figure 7B:
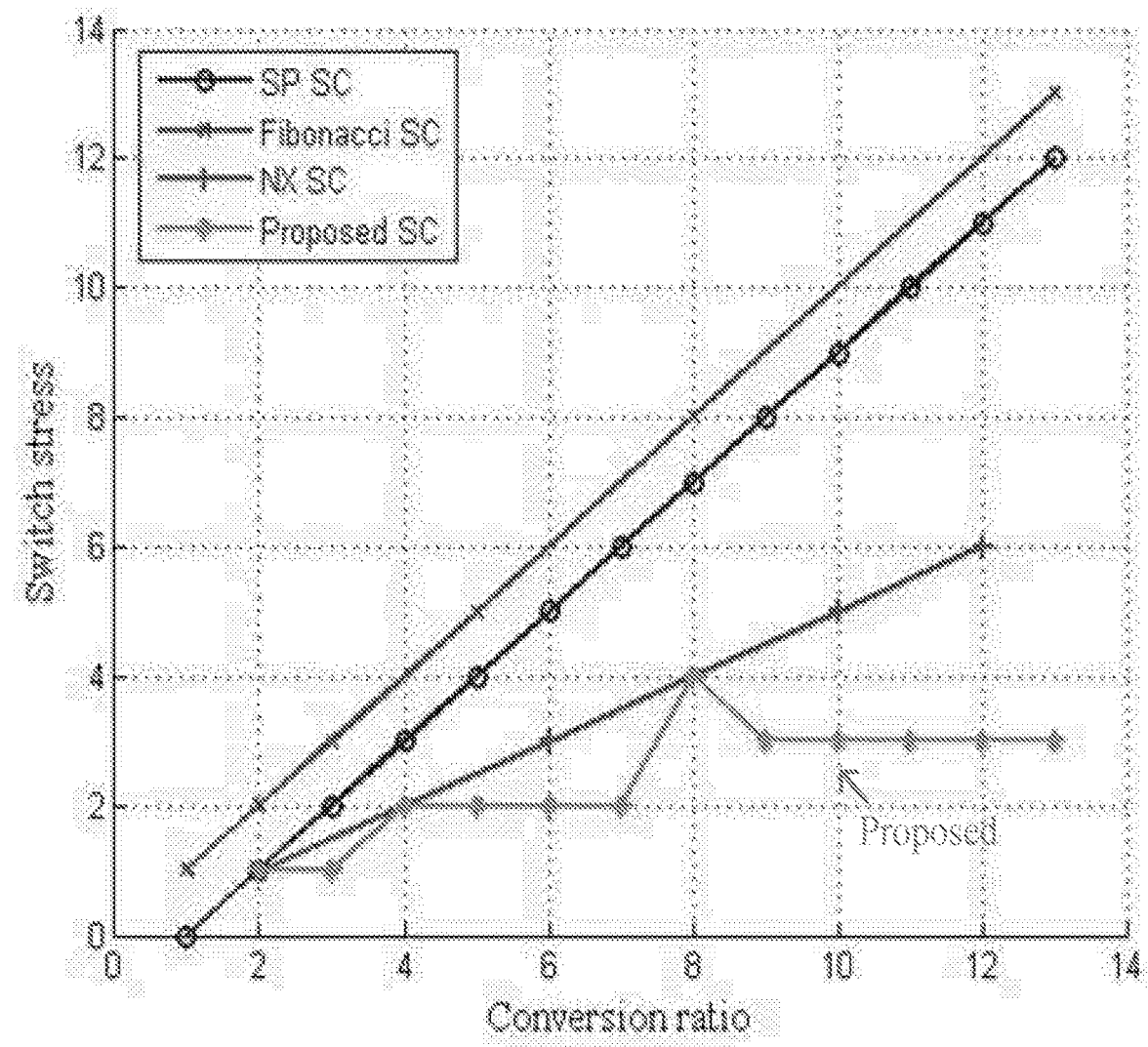
FIG. 7(b) is a graph comparing switch voltage stress of a series-parallel SC converter, a Fibonacci SC converter, a N×SC converter, and a proposed SC converter in accordance with an embodiment of the present invention.
Figure 8A:
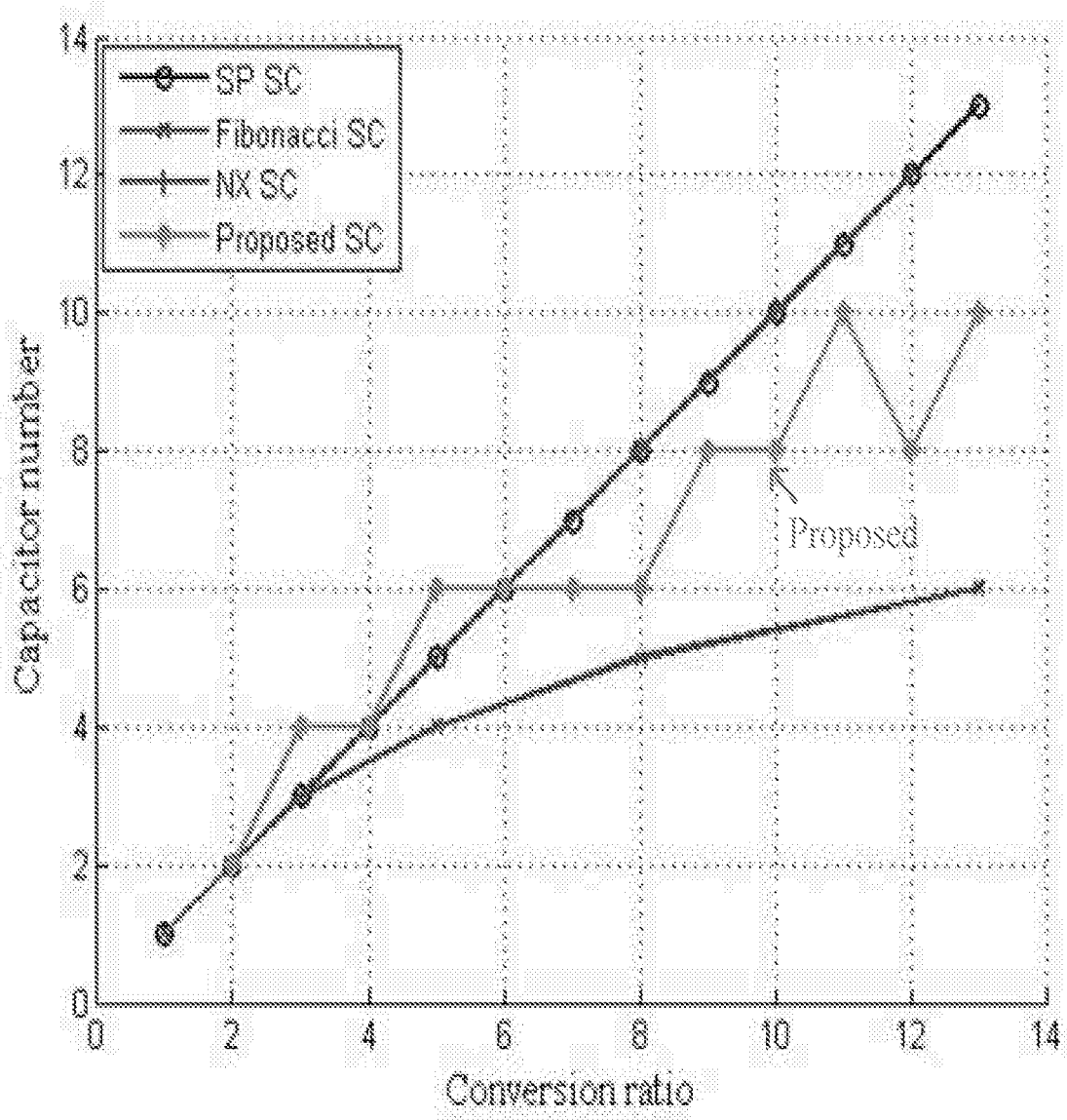
FIG. 8(a) is a graph comparing capacitor numbers of a series-parallel SC converter, a Fibonacci SC converter, a N×SC converter, and a proposed SC converter in accordance with an embodiment of the present invention.
Figure 8B:
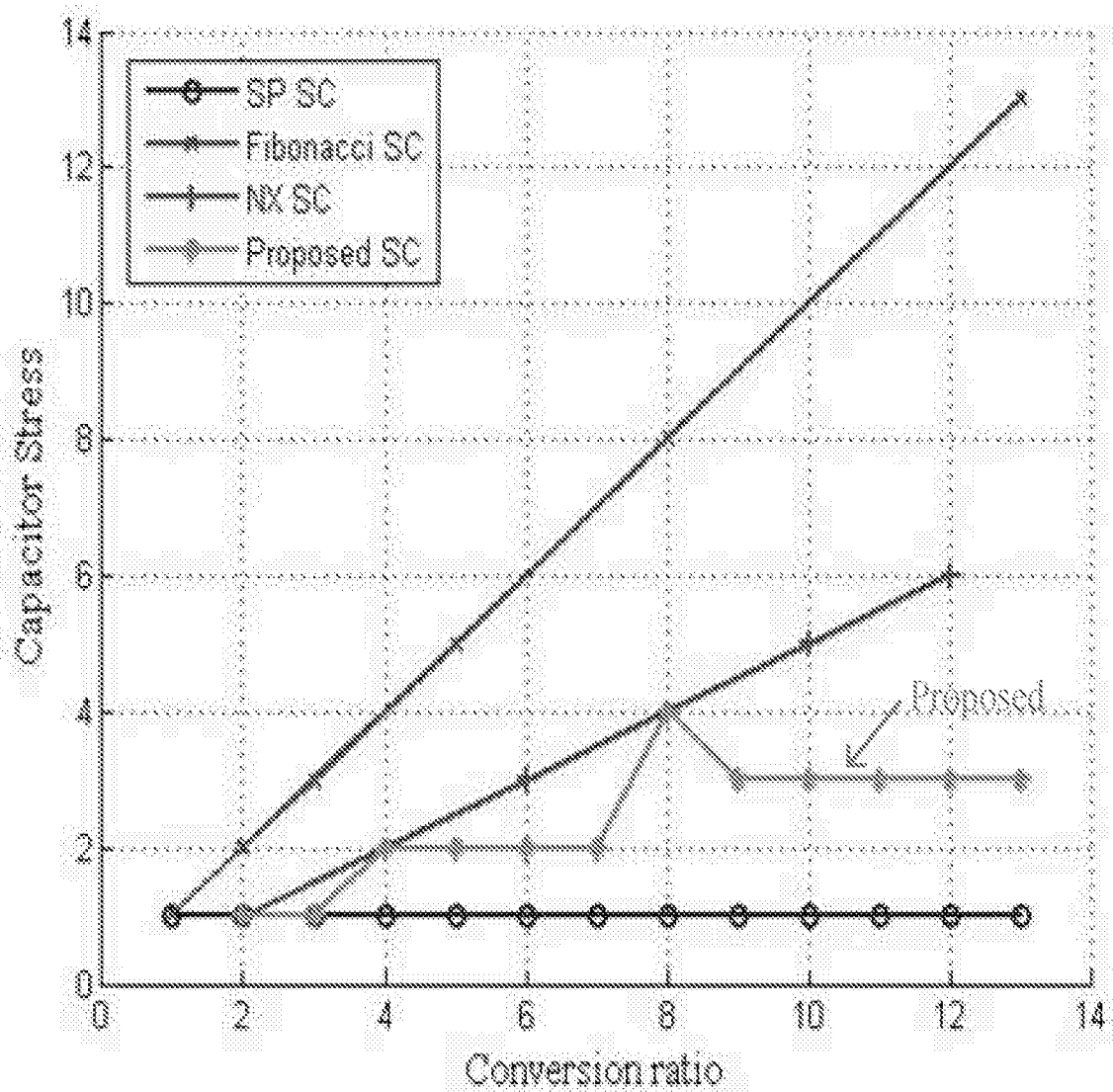
FIG. 8(b) is a graph comparing capacitor voltage stress of a series-parallel SC converter, a Fibonacci SC converter, a N×SC converter, and a proposed SC converter in accordance with an embodiment of the present invention.

This invention describes a configuration method and apparatus of a series of bidirectional SC converters that possess many advantageous properties:

(1) Using fewer switches as compared to other topologies, and that of the voltage stress of the switches is low (refer to FIG. 7);

(2) The capacitor number is relatively low, and the voltage stress of the capacitors is also relatively low (refer to FIG. 8);

(3) Very high efficiency.

(4) Small size and light weight;

(5) Capable of operating in the high temperature environment;

(6) Simple control, with the duty ratio of all switches of the converter being typically (but not necessarily) set at 0.5;

(7) Achieving flexible conversion gain of M=2, 3, . . . , n, or $$M = \frac{1}{2}, \frac{1}{3}, \ldots, \frac{1}{n}, M = \frac{m}{n}$$

where m and n are positive integers and m<n.

(8) Achieving very high-conversion gain at high efficiency.

This invention is on a series of power converter architectures that can achieve high efficiency and flexible conversion gain ratio even high-voltage-gain conversion and that allows bi-directional power flow. The SC converters are composed of two or more basic structures, where the basic structures are N-time bidirectional SC structures (N=2, 3, 4, 5, . . . ). By combining two or more of the basic structures, bidirectional SC converters that can achieve an M-time conversion ratio can be obtained.

By strategically placing additional switches in these bidirectional SC converters, and along with well-designed control, SC converters with reconfiguration gain ratio can be obtained. Furthermore, by replacing each switch in the proposed topologies with a set of back-to-back switch and reconfiguring the control scheme, bidirectional AC-AC converters can be obtained.

According to this invention, the derivable SC converters are composed of a combination of two or more basic structures made up of various possible SC structures. For ease of communication, we limit our discussion to the (a) two-time bidirectional SC structure and the (b) three-time bidirectional SC structure shown in FIG. 9. The operation of these basic structures will first be introduced before the proposed SC converters are illustrated.

A. Operation of the Basic Structures

Both the two-time and the three-time bidirectional SC structures work in two modes: the step-up mode and the step-down mode. Assume that the flying capacitors and the bypass capacitors are large and that the voltages of these capacitors are constant.

1) Step-Up Mode of the Two-Time Bidirectional SC Structure:

In step-up mode, the low voltage side $V_L$ is connected to a power source and the high voltage side $V_H$ is connected to the load. According to its operation timing diagram shown in FIG. 9(c), there are two operating states, which are shown in FIG. 10. In these two states, the flying capacitor $C_{f1}$ is alternatively paralleled with the low voltage side $V_L$ and the bypass capacitor $C_{11}$. In one phase, the flying capacitor $C_{f1}$ is paralleled with the low voltage side $V_L$ (see FIG. 10(a)). In this state, the flying capacitor $C_{f1}$ is charged by the low side voltage source, and at the end of this state, the voltage of the flying capacitor $V_{cf1}$ would be equal to the low side voltage $V_L$, i.e., $$V_{cf1} = V_L. \tag{1}$$

Figure 10A:
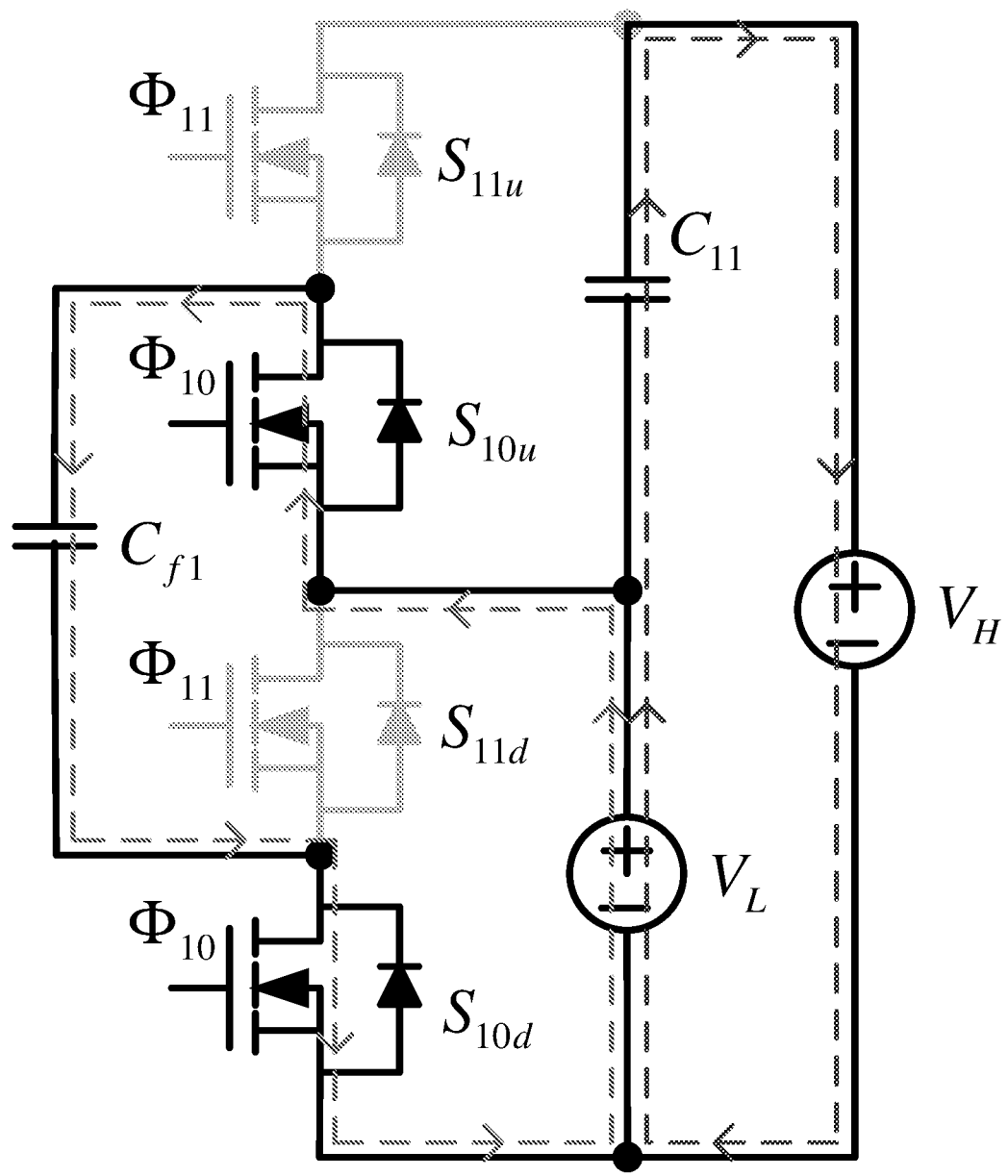
FIGS. 10(a) and (b) are schematic diagrams of a two-time bidirectional SC converter in accordance with an embodiment of the present invention, showing current flow paths in two respective phases of a step-up mode of operation.
Figure 10B:
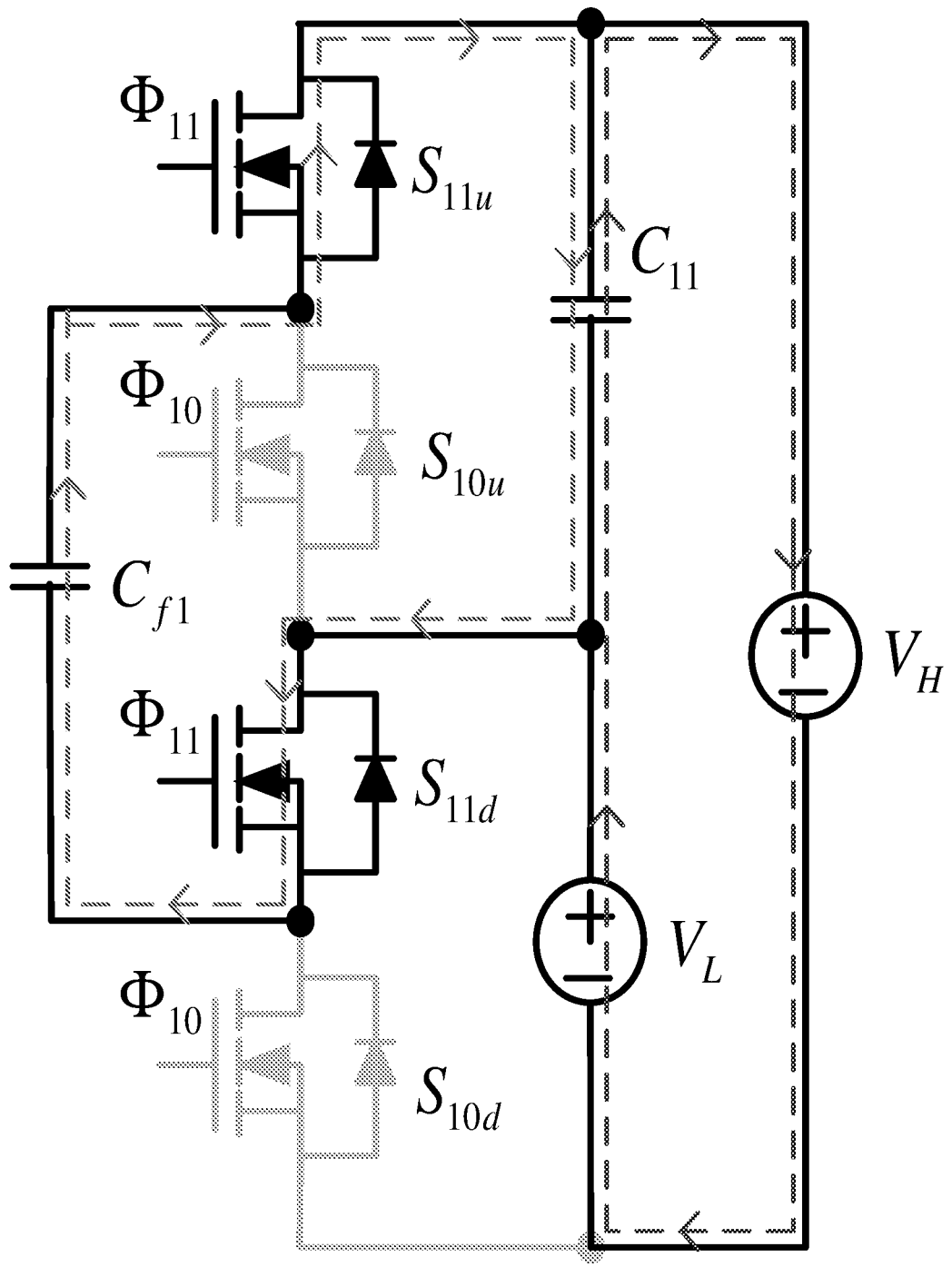

In the other phase, as shown in FIG. 10(b), the flying capacitor $C_{f1}$ is paralleled with the bypass capacitor $C_{11}$. In this state, $C_{f1}$ would discharge to $C_{11}$, which leads to the bypass capacitor voltage being equal to the flying capacitor's voltage, i.e., $$V_{c11} = V_{cf1}. \tag{2}$$

Throughout this specification, an equation is initially cited with a number in round brackets and further references to the same equation are made by citing said number in round brackets.

Hence, in steady state, according to (1) and (2), the voltage of the bypass capacitor will be equal to the low side voltage, i.e., $$V_{c11} = V_L. \tag{3}$$

According to the circuit, the high voltage side $V_H$ is the sum of the bypass capacitor voltage $V_{c11}$ and the low side voltage $V_L$, i.e., $$V_H = V_{c11} + V_L. \tag{4}$$

Therefore, the high side voltage $V_H$ is double of the low side voltage $V_L$, that is $$V_H = 2 \cdot V_L \tag{5}$$

Hence, in the step-up mode, the voltage-conversion ratio of two-time bidirectional SC structure is N=2.

Figure 11A:
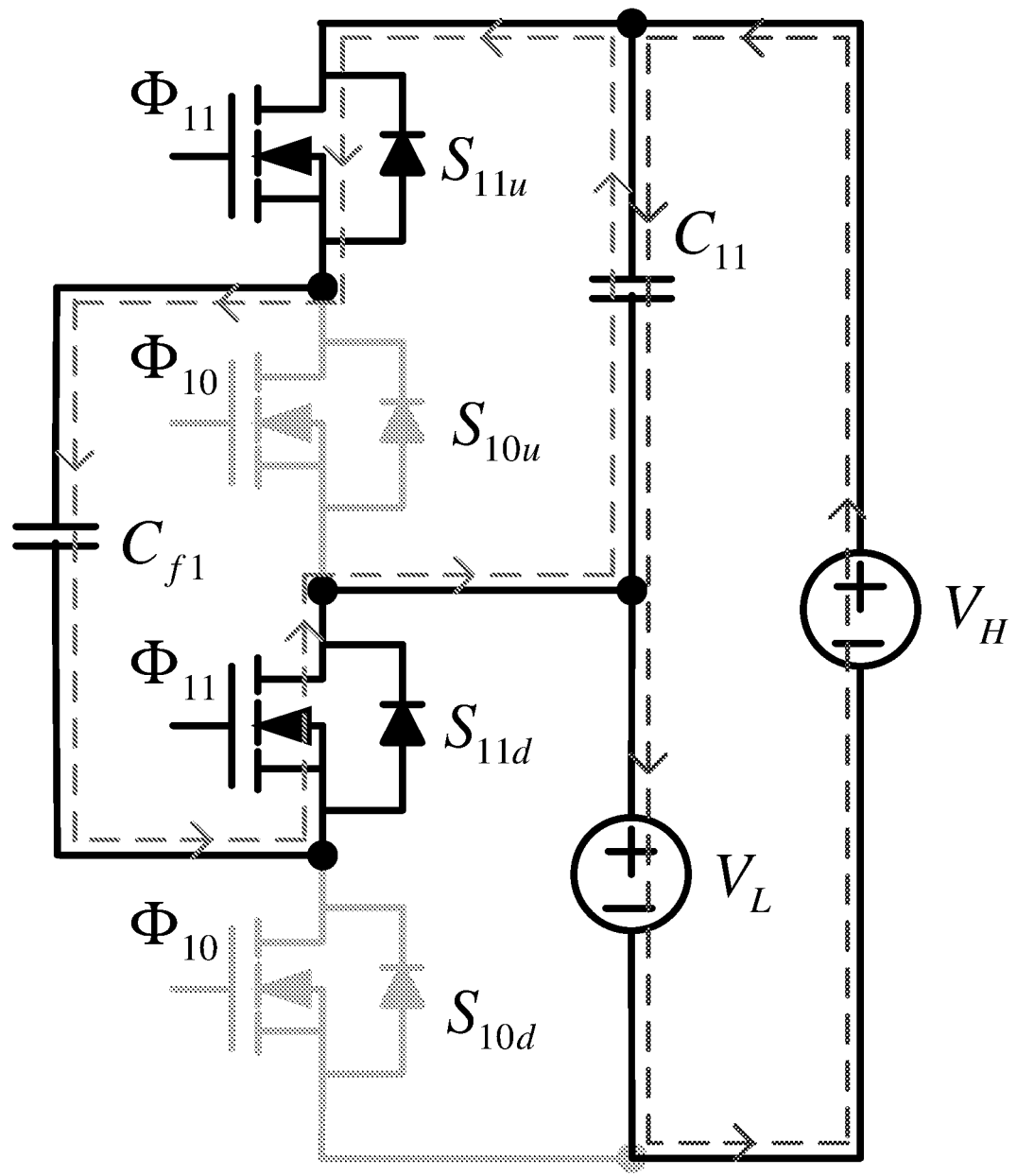
FIGS. 11(a) and (b) are schematic diagrams of a two-time bidirectional SC converter in accordance with an embodiment of the present invention, showing current flow paths in two respective phases of a step-down mode of operation.

2) Step-Down Mode of the Two-Time Bidirectional SC Structure:

In this mode, the high voltage side $V_H$ is connected to a power source and the low voltage side $V_L$ is connected to a load. Here, there are two operating states. In State 1, as shown in FIG. 11(a), the flying capacitor $C_{f1}$ is paralleled with the bypass capacitor $C_{11}$, and it is charged by the power source to its voltage level, i.e., $$V_{cf1} = V_{c11}. \tag{6}$$

Figure 11B:
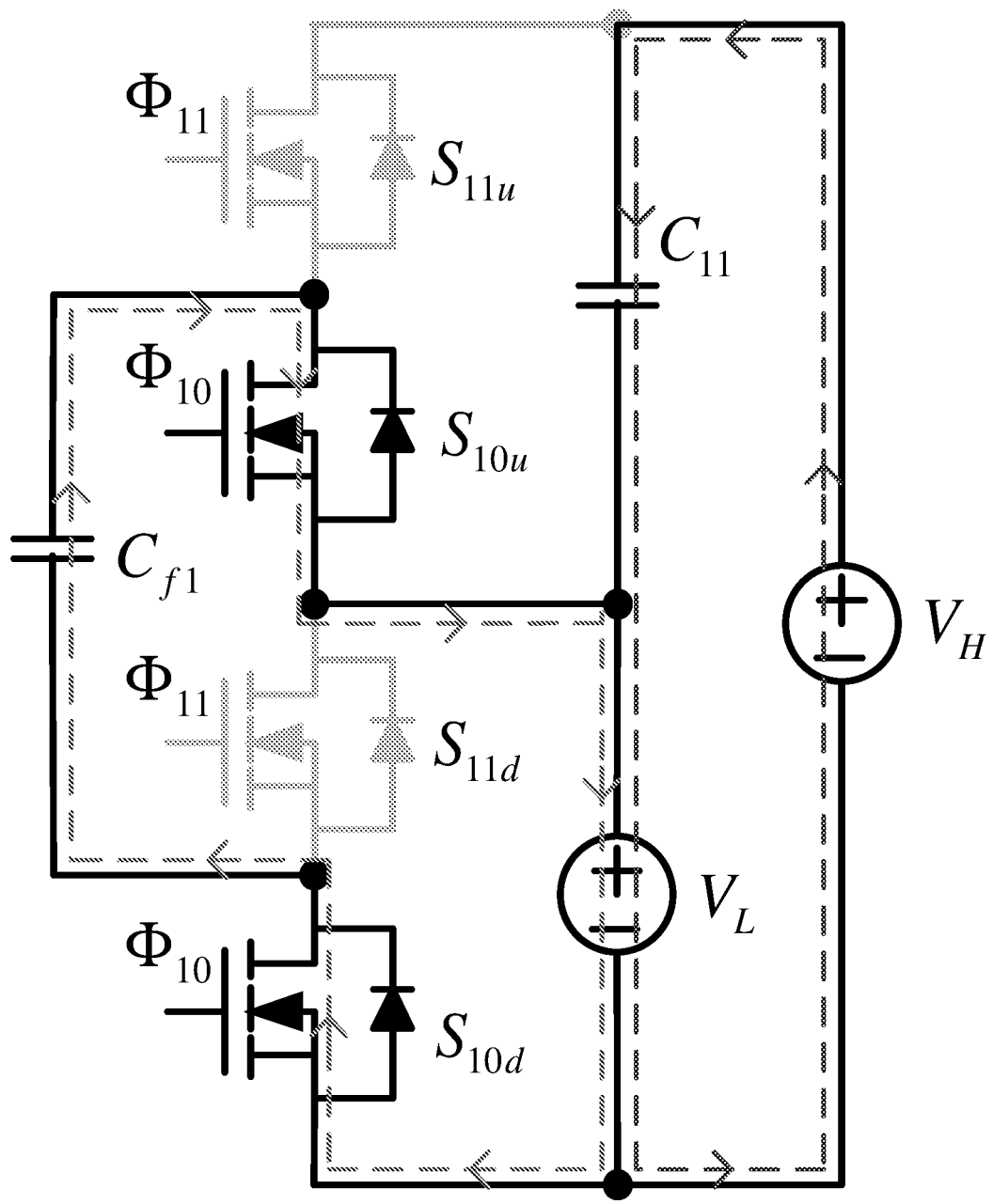

In state 2, as shown in FIG. 11(b), the flying capacitor would parallel with and discharge to the load. This makes the low side voltage equals with the voltage of the flying capacitor, i.e., $$V_L = V_{cf1}. \tag{7}$$

Since $$V_L = V_{c11}. \tag{8}$$

and $$V_L = V_{11} + V_L. \tag{9}$$

therefore $$V_L = \frac{V_H}{2}. \tag{10}$$

Hence, in the step-down mode, the conversion ratio of the two-time bidirectional SC structure is =1/2.

Figure 9A:
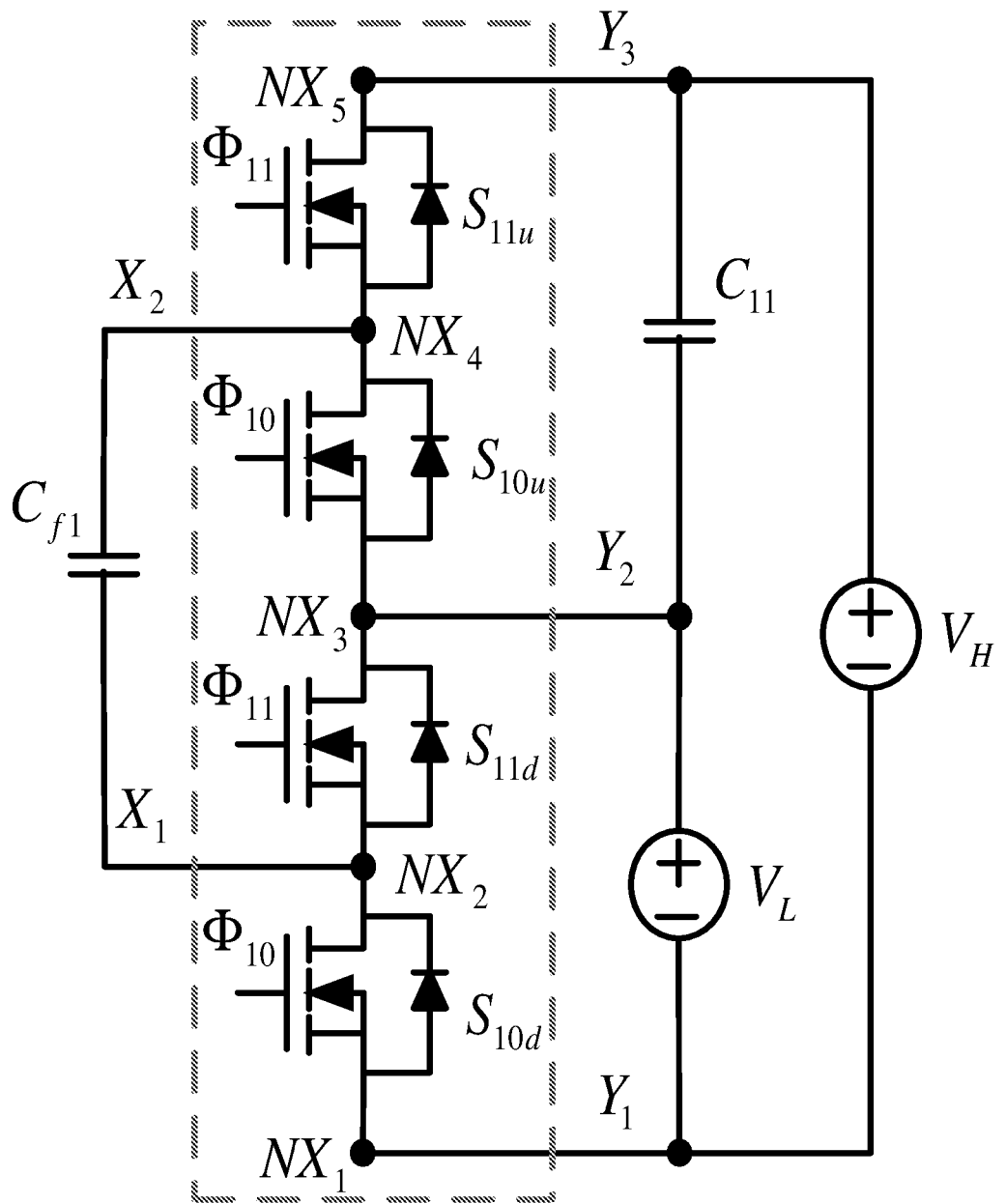
FIG. 9(a) is a schematic diagram of a two-time bidirectional SC converter in accordance with an embodiment of the present invention.
Figure 9B:
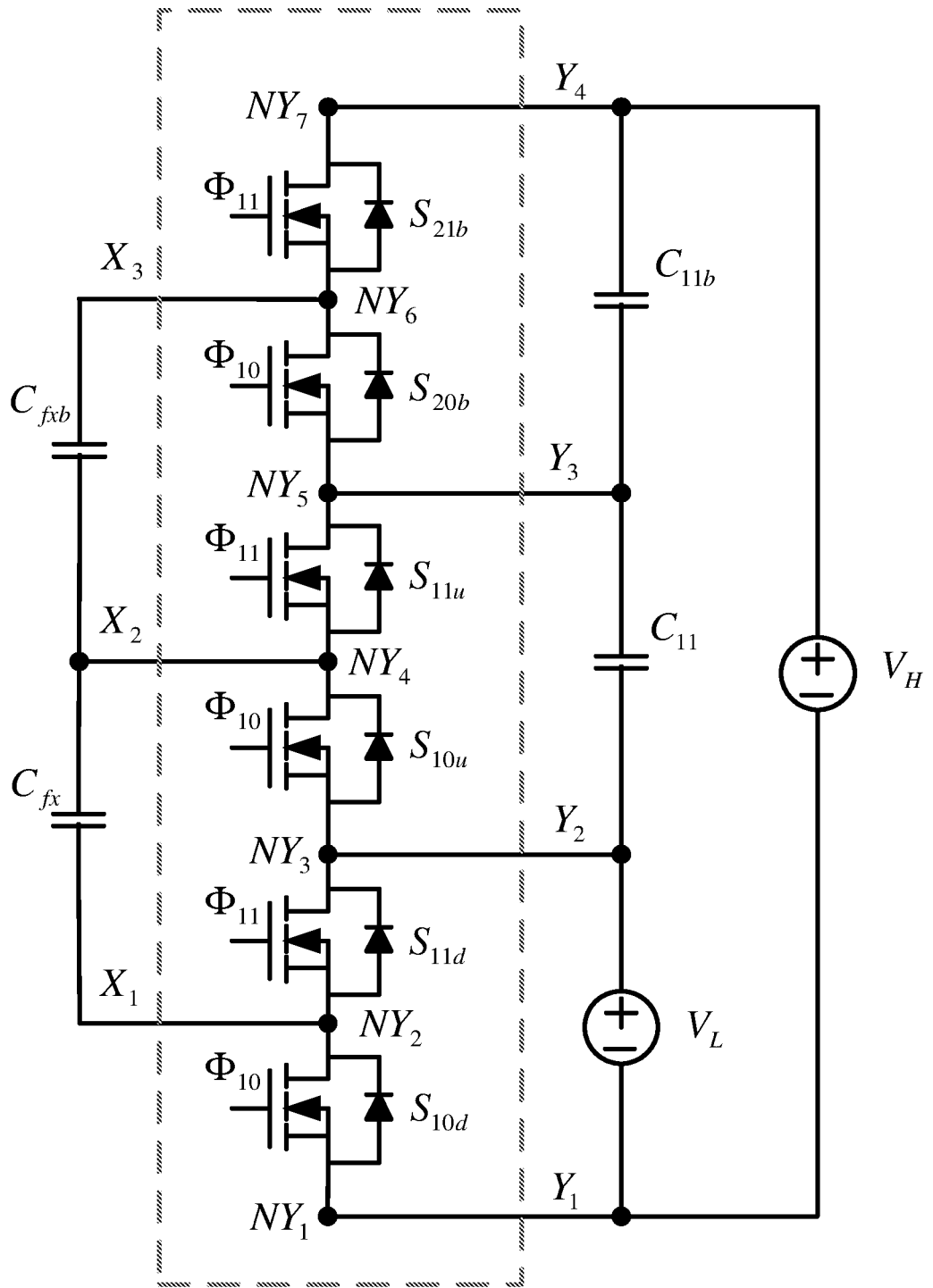
FIG. 9(b) is a schematic diagram of a three-time bidirectional SC converter in accordance with an embodiment of the present invention.
Figure 9C:
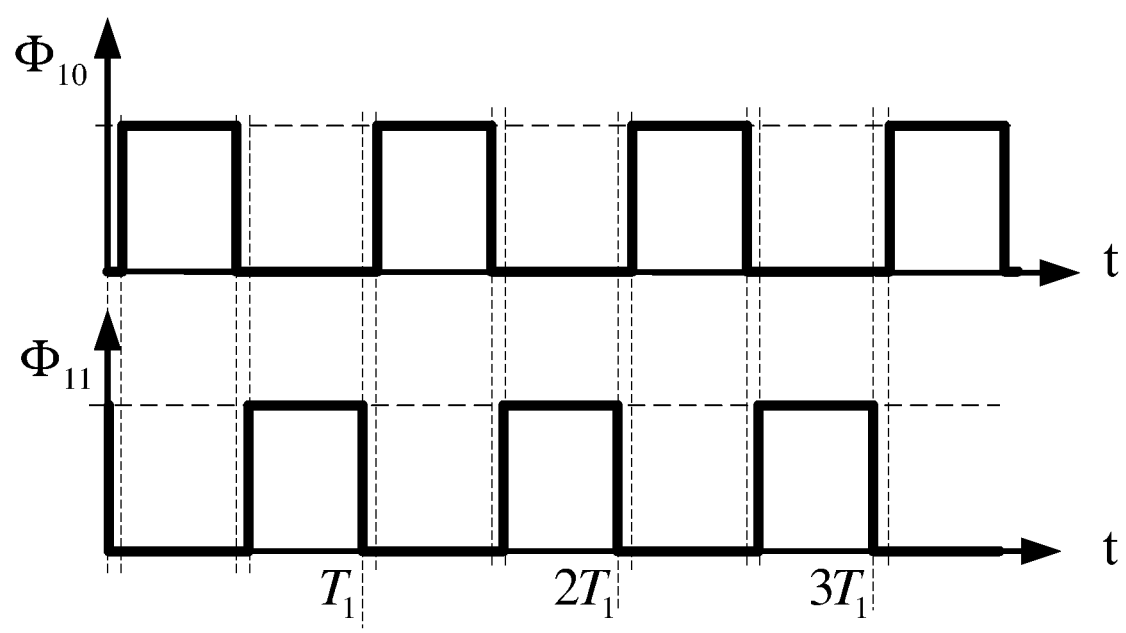
FIG. 9(c) are timing diagrams of the SC converters shown in FIGS. 9(a) and 9(b)
Figure 12A:
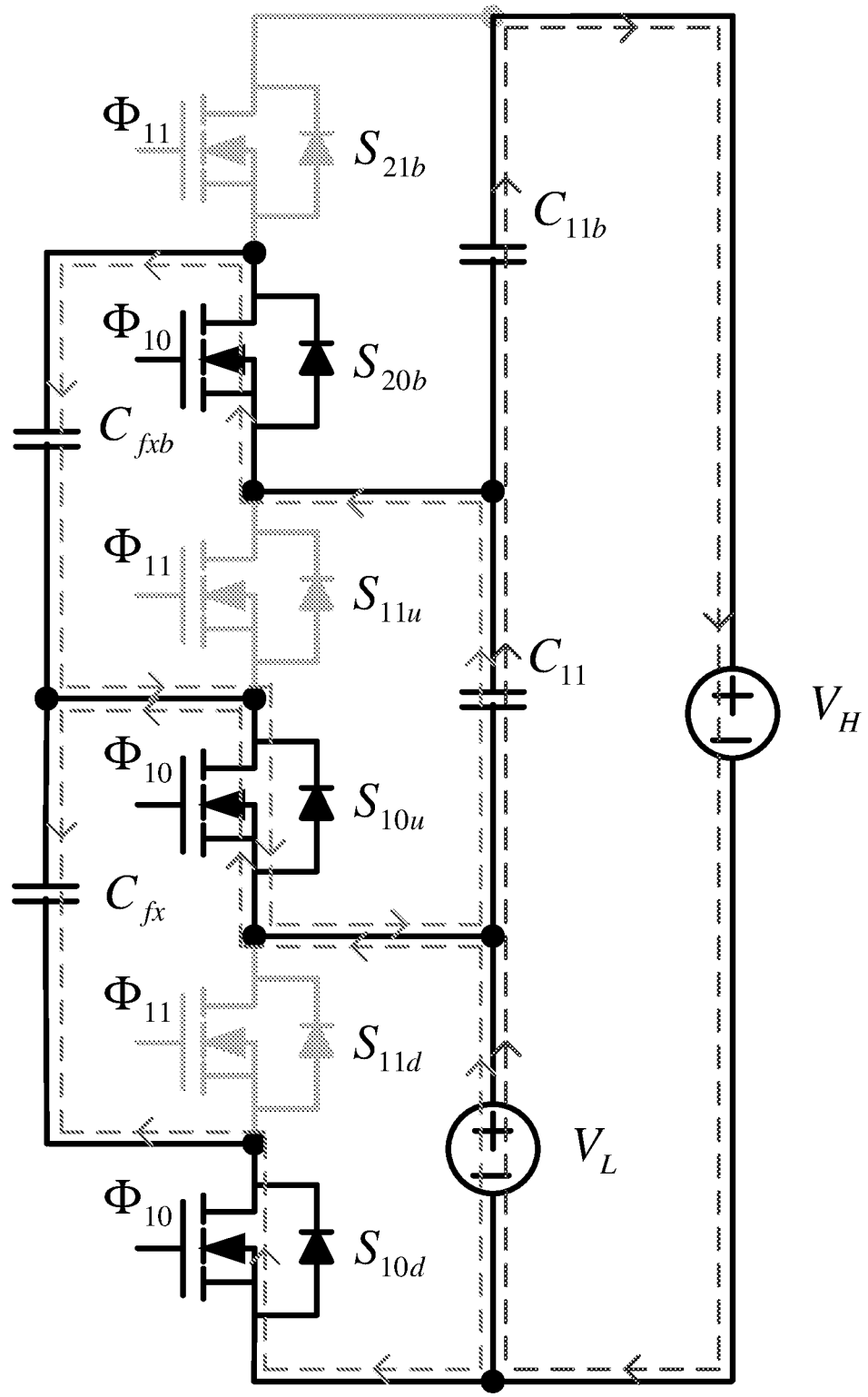
FIGS. 12(a) and (b) are schematic diagrams of a three-time bidirectional SC converter in accordance with an embodiment of the present invention, showing current flow paths in two respective phases of a step-up mode of operation.

3) Step-Up Mode of the Three-Time Bidirectional SC Structure:

The three-time bidirectional SC structure is shown in FIG. 9(b) and its timing diagram is shown in FIG. 9(c). For the step-up mode, the power source is connected to the low voltage side $V_L$, and the high voltage side $V_H$ is connected to the load. The three-time bidirectional SC structure operating in the step-up mode has two states, which are shown in FIG. 12. In State 1, as shown in FIG. 12(a), the two flying capacitors, $C_{fx}$ and $C_{fxb}$, are respectively paralleled to the bypass capacitor $C_{11}$ and the low voltage side $V_L$. The voltages of the flying capacitors are equal to the voltage of their paralleled components, respectively, i.e., $$\begin{cases} V_{cfx} = V_L \\ V_{cfxb} = V_{c11b} \end{cases} \tag{11}$$

Figure 12B:
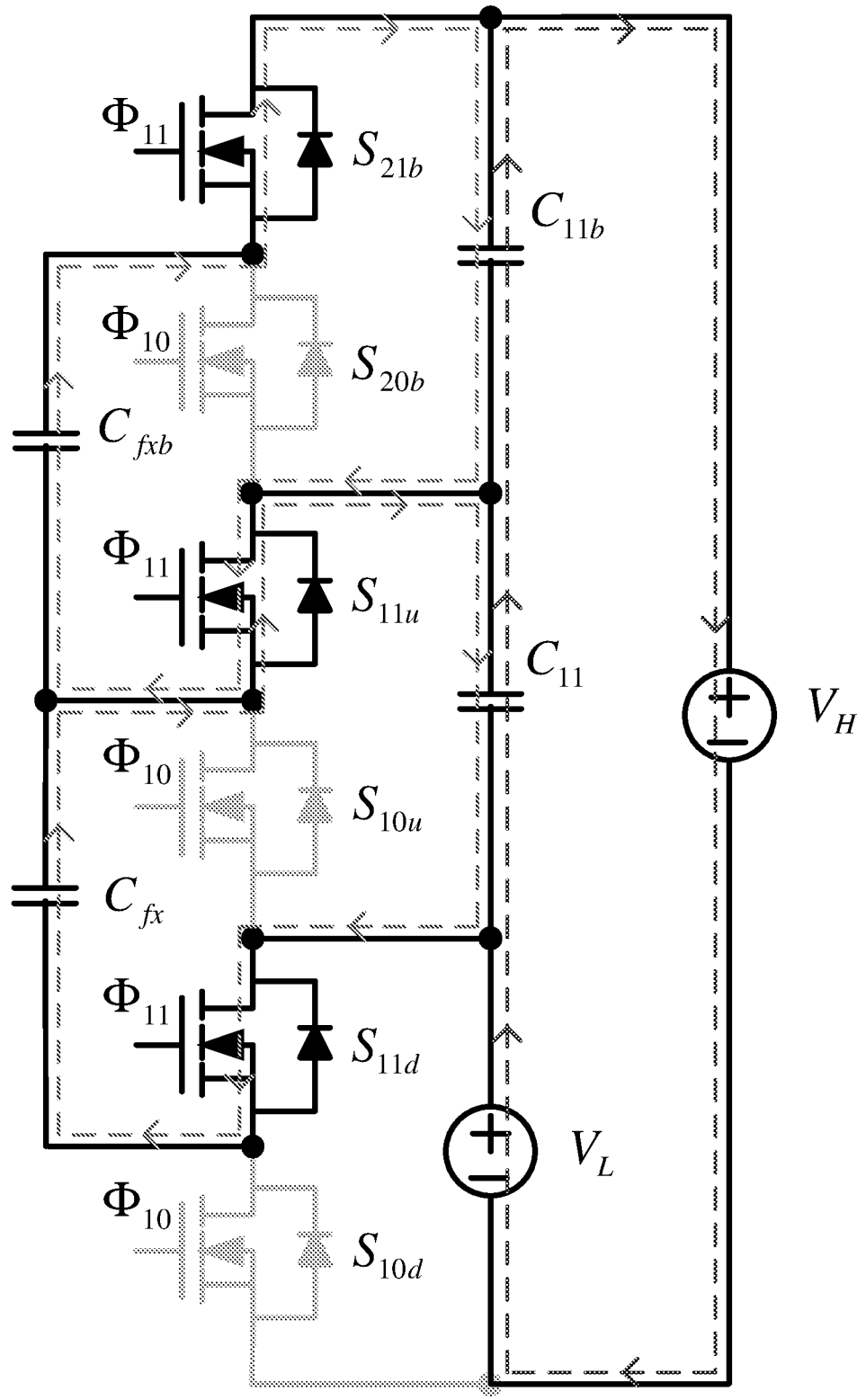

In State 2 (FIG. 12(b)), $C_{fx}$ and $C_{fxb}$ are respectively paralleled to the two bypass capacitors $C_{11}$ and $C_{11b}$, which makes the two bypass capacitors' voltages equal to the voltages of their paralleled flying capacitors, i.e., $$\begin{cases} V_{c11b} = V_{cfxb} \\ V_{c11} = V_{cfx} \end{cases} \tag{12}$$

Hence, the voltages of both the bypass capacitors are equal to the low side voltage, i.e., $$V_{c11b} = V_{c11} = V_L. \tag{13}$$

The high side voltage is the sum of the two bypass capacitors' voltages $V_{c11}$, and $V_{c11b}$ and the low side voltage $V_L$, i.e., $$V_H = V_{c11} + V_L. \tag{14}$$

Therefore, the high side voltage $V_H$ is triple of the low side voltage $V_L$, that is $$V_H = 3 \cdot V_L. \tag{15}$$

Hence, the conversion ratio of the three-time bidirectional SC structure in the step-up mode is N=3.

Figure 13A:
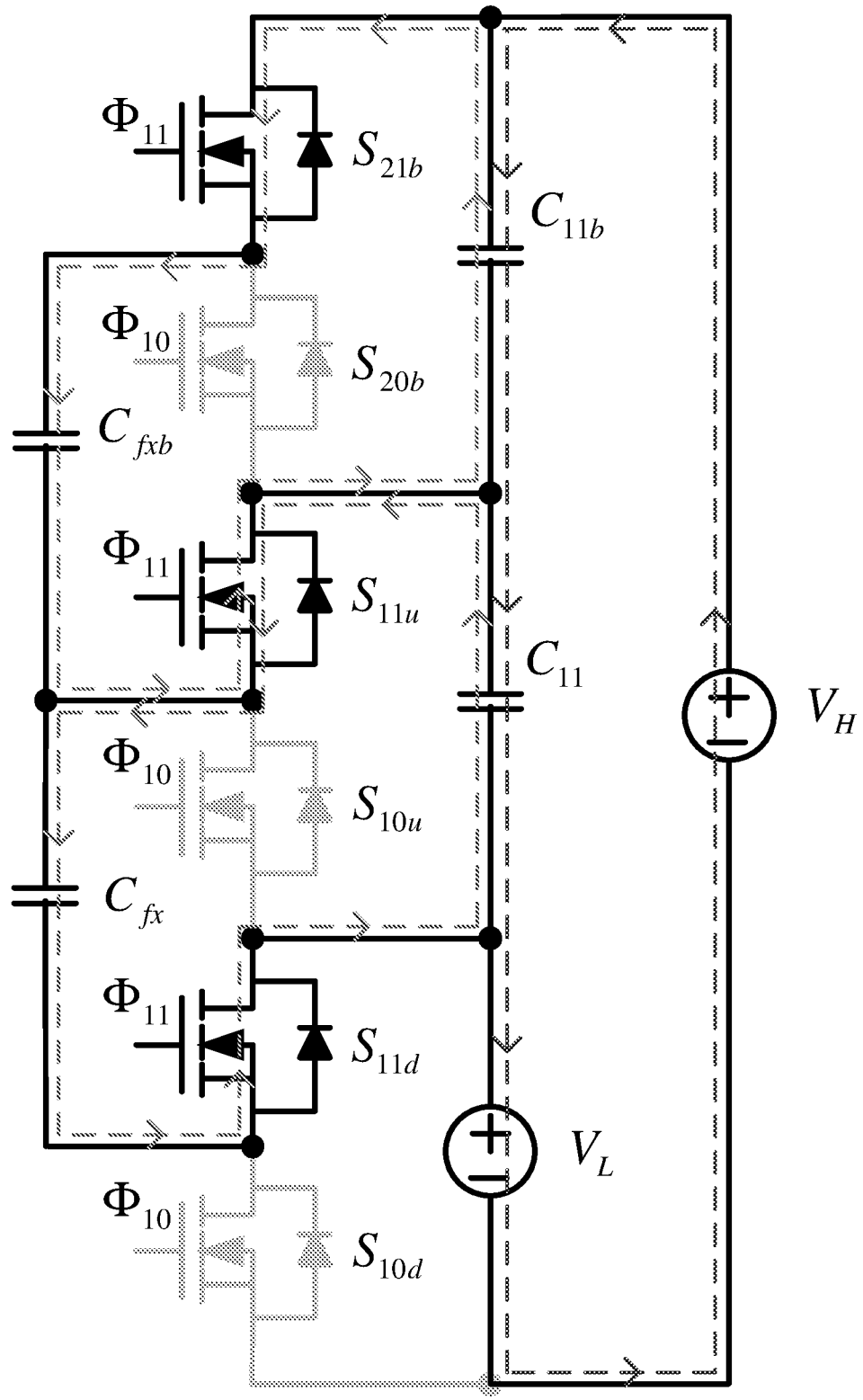
FIGS. 13(a) and (b) are schematic diagrams of a three-time bidirectional SC converter in accordance with an embodiment of the present invention, showing current flow paths in two respective phases of a step-down mode of operation.
Figure 13B:
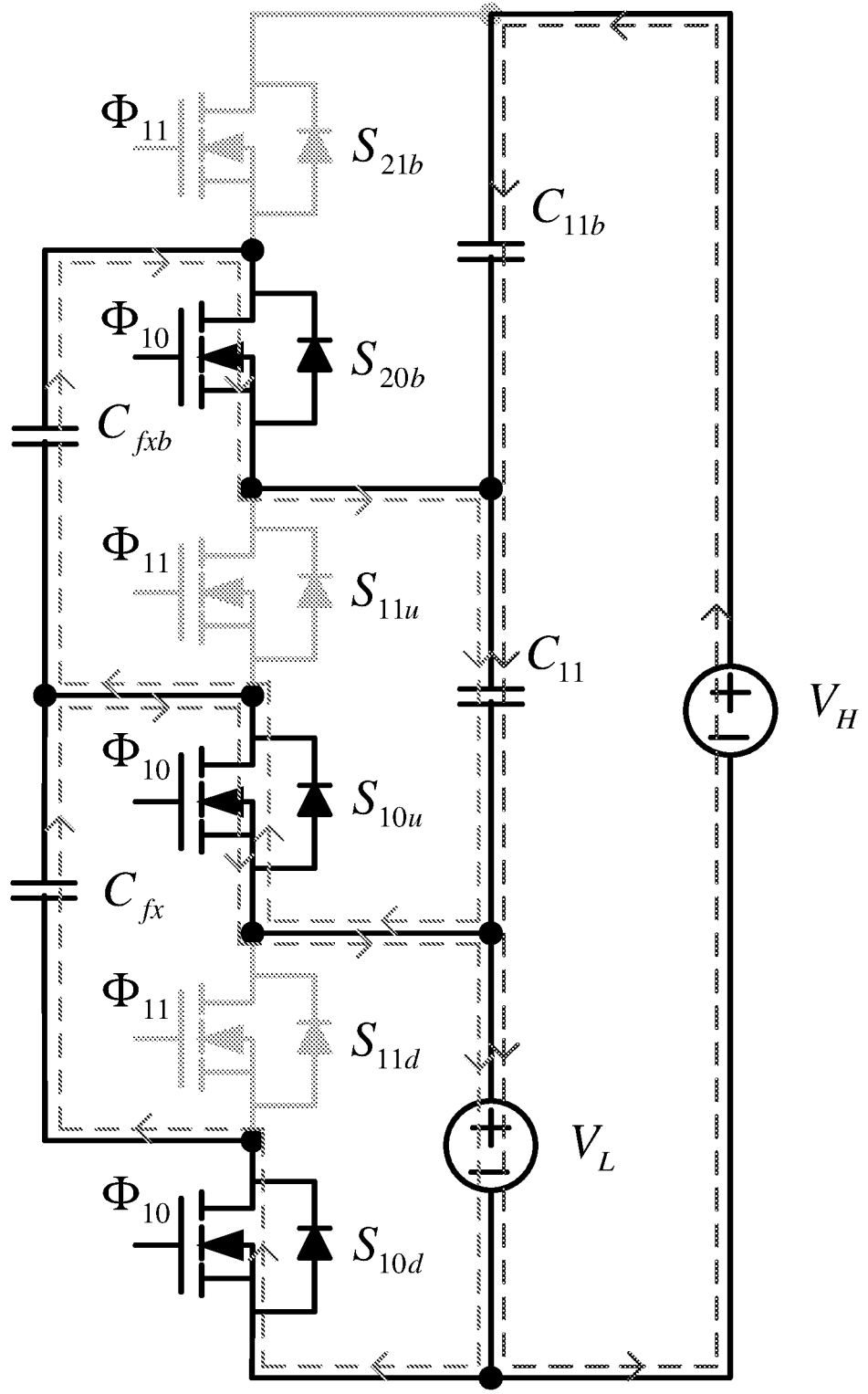

4) Step-Down Mode of the Three-Time Bidirectional SC Structure:

In this mode, the power source is connected to the high voltage side $V_H$ and the load is connected to the low voltage side $V_L$. There are two operating states in this mode, as shown in FIG. 13. In State 1, the two flying capacitors $C_{fx}$ and $C_{fxb}$ are paralleled to $C_{11}$ and $C_{11b}$, respectively. The voltages of the flying capacitors at the end of each charging state is equal to that of the two bypass capacitors, i.e., $$\begin{cases} V_{cfx} = V_{c11} \\ V_{cfxb} = V_{c11b} \end{cases} \tag{16}$$

In State 2, the two flying capacitors $C_{fx}$ and $C_{fxb}$ are respectively paralleled to the low voltage side $V_L$ and the bypass capacitor $C_{11}$. Both the two flying capacitors $C_{f1}$ and $C_{f1b}$ are discharged to the voltage level of $$\begin{cases} V_L = V_{fx} \\ V_{c11} = V_{fxb} \end{cases} \quad (17)$$

At steady state, $$V_L = V_{c11} = V_{c11b} \quad (18)$$

and $$V_H = V_{c11} + V_{c11b} + V_L. \quad (19)$$

Hence, $$V_L = \frac{V_H}{3}. \quad (20)$$

The conversion ratio of the three-time bidirectional SC structure in the step-down mode is N=1/3.

Figure 14:
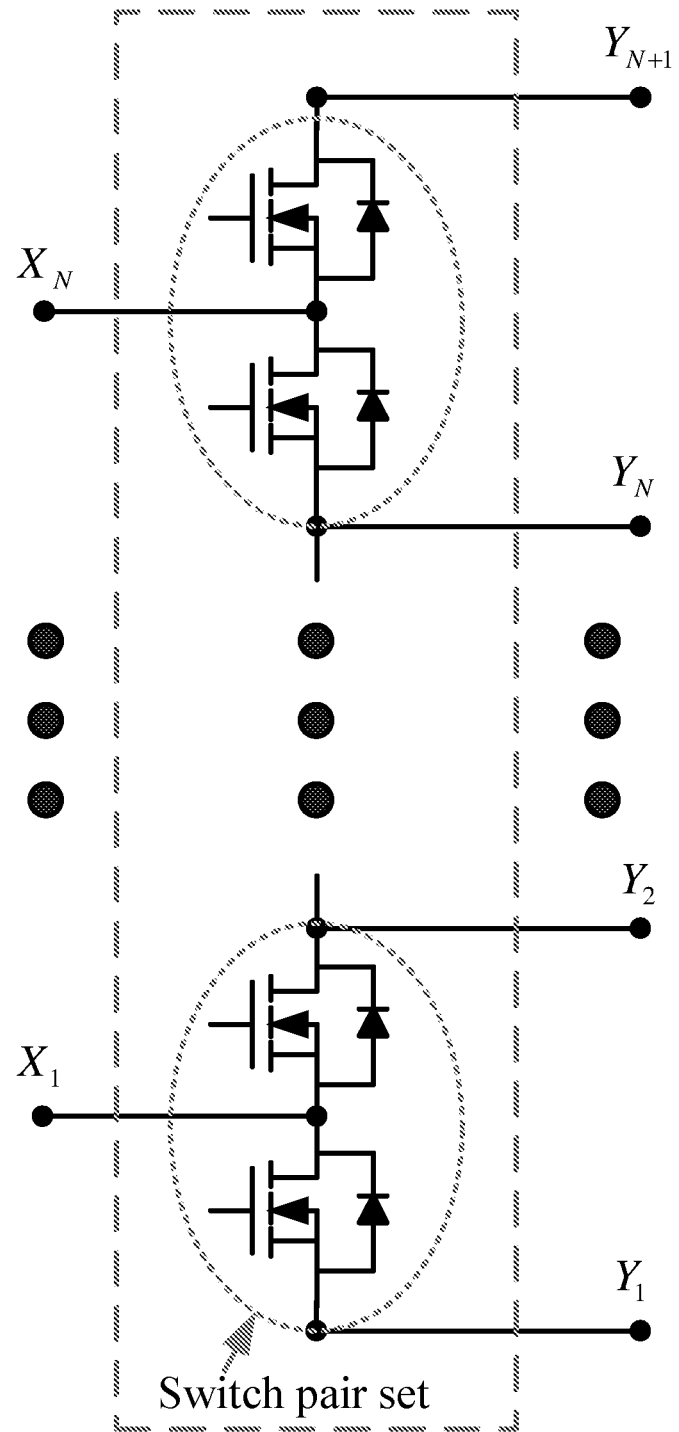
FIG. 14 is a schematic diagram of a general switch block of an N×SC converter in accordance with an embodiment of the present invention.

5) N-Time Bidirectional SC Structure:

For an N-time SC structure, which is shown in FIG. 14, there will be N number of X nodes and N+1 number of Y nodes. Similarly, using the same approach given above, the operation of the N-time SC structure, where N≥2, can be analyzed.

B. Configuration Method

Figure 15A:
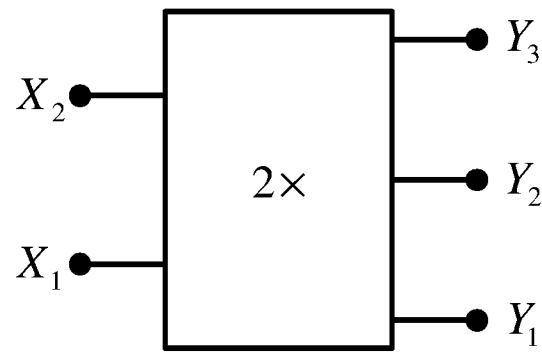
FIG. 15(a) is a schematic block diagram of a switch block of a two-time SC converter in accordance with an embodiment of the present invention.
Figure 15B:
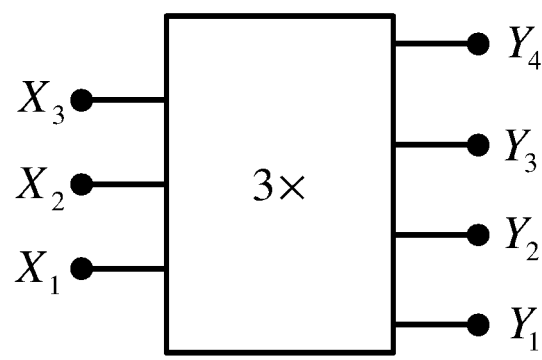
FIG. 15(b) is a schematic block diagram of a switch block of a three-time SC converter in accordance with an embodiment of the present invention.
Figure 15C:
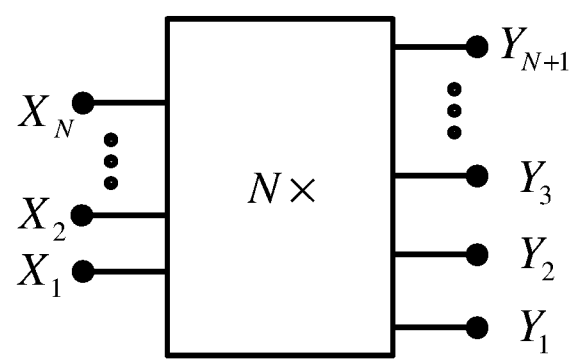
FIG. 15(c) is a schematic block diagram of a switch block of an N-time SC converter in accordance with an embodiment of the present invention.

FIG. 15 respectively shows the simplified basic blocks of a two-time and three-time SC structure as that given in FIGS. 9(a) and 9(b), and an N-time SC structure as given in FIG. 15(c). For the block diagram of the two-time SC structure, the flying capacitor is connected to nodes $X_1$ and $X_2$ and the bypass capacitor and/or input voltage source are connected to $Y_1$, $Y_2$, and $Y_3$. For the three-time SC structure, the two flying capacitors are connected to the nodes $X_1$, $X_2$, and $X_3$, and the bypass capacitors and/or voltage source are connected to nodes $Y_1$, $Y_2$, $Y_3$, and $Y_4$.

Figure 16A:
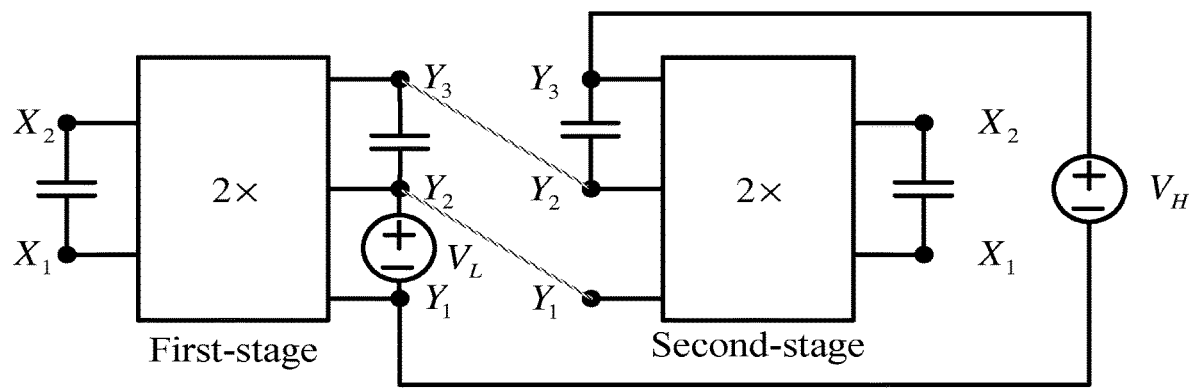
FIGS. 16(a) and (b) are schematic block diagrams of two-stage SC converters in accordance with embodiments of the present invention, with each stage of each converter based on a two-time switch block, and with the converters of FIGS. 16(a) and 16(b) providing conversion ratios of 3 and 4 respectively.
Figure 16B:
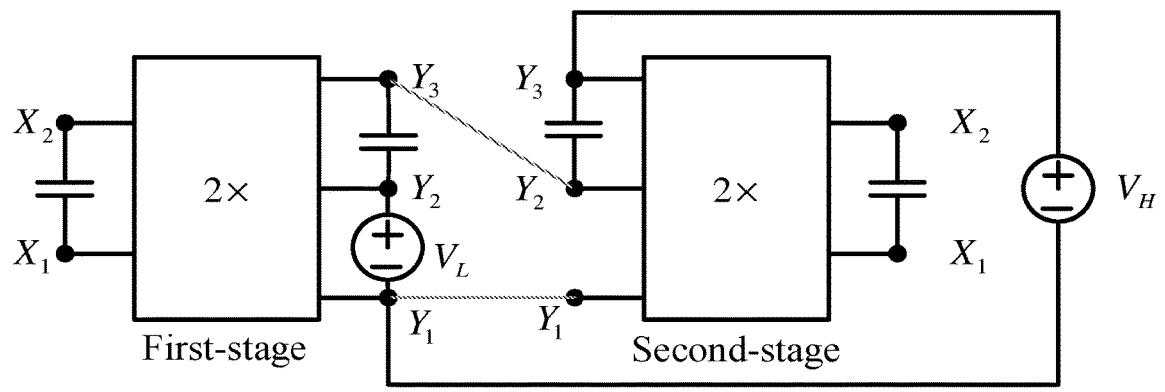

The configuration approach is to connect any two or more of these SC structures to form the SC converters. FIG. 16 is an example of forming two-stage SC converters based on two units of the two-time SC structures with different conversion ratios M. FIG. 16(a) is a three-time SC converter formed by two units of the two-time SC structure. Here, nodes $Y_1$ and $Y_2$ of the second-stage SC structure are connected to nodes $Y_2$ and $Y_3$ of the first-stage SC structure. FIG. 16(b) is another possible combination of the two-stage SC converter based on two units of the two-time SC structure, which has a conversion ratio of M=4. The combination is for nodes $Y_1$ and $Y_2$ of the second-stage SC structure to connect nodes $Y_1$ and $Y_3$ of the first-stage SC structure. Similarly, numerous combinations of the two-stage SC converters with two basic structures can be formed.

FIG. 17 is an example of forming three-stage SC converters based on three units of the two-time SC structures with different conversion ratios. FIGS. 17(a)-17(c) are the combinations of a two-time SC structure with the two-stage SC converter given in FIG. 16(a), and FIGS. 17(d)-17(f) are the combinations of a two-time SC structure with the two-stage SC converter given in FIG. 16(b). A three-stage SC converter with a conversion ratio of M=4 as shown in FIG. 17(a) is formed by connecting nodes $Y_1$, and $Y_2$ of the third-stage SC structure to nodes $Y_2$ and $Y_3$ of the second-stage SC structure shown in FIG. 16(a), where node $Y_2$ of the second-stage SC structure is also node $Y_3$ of the first-stage SC structure. A three-stage SC converter with a conversion ratio of M=5 as shown in FIG. 17(b) is formed by connecting nodes $Y_1$, and $Y_2$ of the third-stage SC structure to nodes $Y_1$ and $Y_3$ of the second-stage SC structure given in FIG. 16(a), where node $Y_1$ of the second-stage SC structure is also node Y of the first-stage SC structure. A three-stage SC converter with conversion ratio of M=6 as shown in FIG. 17(c) is formed by connecting nodes $Y_1$ and $Y_2$ of the third-stage SC structure to nodes $Y_1$ of the first-stage SC structure and $Y_3$ of the second-stage SC structure as shown in the FIG. 16(a). Using the same approach, FIGS. 17(d)-17(f) can be formed. Similarly, numerous combinations of three-stage SC converters with three basic structures can be formed.

Figure 18:
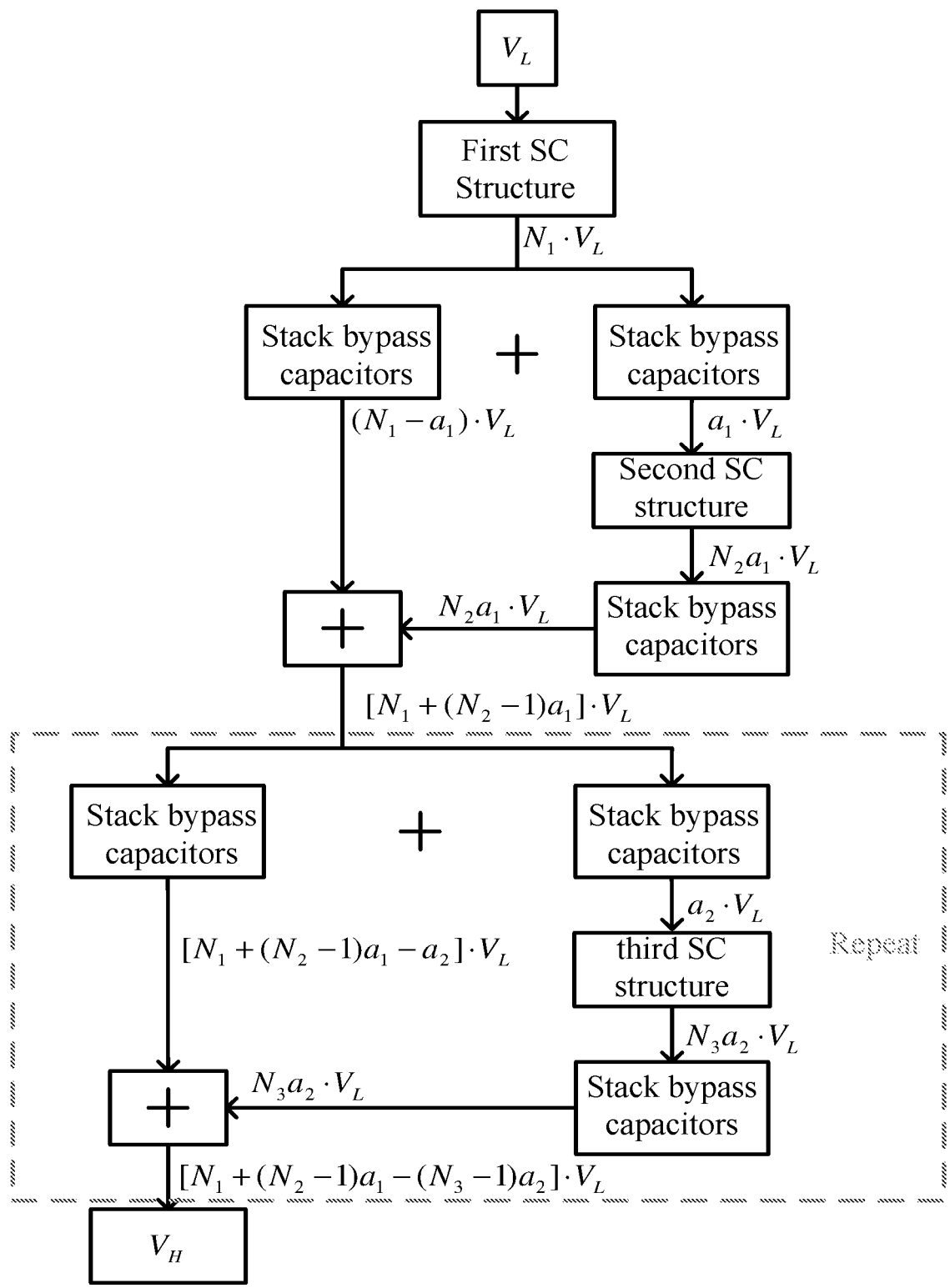
FIG. 18 is a flow diagram of a general method for designing SC converters in accordance with an embodiment of the present invention.

Hence, higher-stage SC converters can be formed using same approach as that given for deriving the three-stage SC converters. The input nodes of the highest-stage SC structure can be connected to any two nodes of a previous stage. It is important to emphasize that the positions of the input voltage source and the flying capacitors or series-connected bypass capacitors can be interchanged. An overview of the logic flow of the configuration method for deriving the M-time SC converters is shown in FIG. 18.

C. m-Time or $$\frac{1}{m}\text{-time}$$

(m is Integer) Bidirectional SC Converters

By adopting a combination of two or more of the basic structures, a series of m-time and $$\frac{1}{m}\text{-time}$$

bidirectional SC DC-DC converters can be derived. The converter is a cascade of one or more multiple stages of the basic structures. Here, the step-up mode operation is used to introduce the proposed bidirectional SC topologies, which are using $V_L$ as the input and $V_H$ as the output. The number 2 is used to represent the two-time bidirectional SC structure and 3 to represent the three-time bidirectional SC structure.

For this series of SC converters, the input and output are of common ground. The input is connected to $V_L$ of the first stage.

TABLE I

| | Two-stage converters | | | |
|---|---|---|---|---|
| Combination | first-stage $V_L$ connected nodes | second-stage $V_L$ connected nodes | $V_H$ connected nodes | conversion ratio (M) |
| 1 | 22 | $NA_3$, $NA_1$ | $NA_5$, $NA_3$ | $NB_5$, $NA_1$ | 3/⅓ |
| 2 | 22 | $NA_3$, $NA_1$ | $NA_5$, $NA_1$ | $NB_5$, $NA_1$ | 4/¼ |
| 3 | 23 | $NA_3$, $NA_1$ | $NA_5$, $NA_3$ | $NB_7$, $NA_1$ | 4/¼ |
| 4 | 23 | $NA_3$, $NA_1$ | $NA_5$, $NA_1$ | $NB_5$, $NA_1$ | 6/⅙ |
| 5 | 32 | $NA_3$, $NA_1$ | $NA_7$, $NA_5$ | $NB_5$, $NA_1$ | 4/¼ |
| 6 | 32 | $NA_3$, $NA_1$ | $NA_7$, $NA_5$ | $NB_5$, $NA_1$ | 5/⅕ |
| 7 | 32 | $NA_3$, $NA_1$ | $NA_7$, $NA_3$ | $NB_5$, $NA_1$ | 6/⅙ |
| 8 | 33 | $NA_3$, $NA_1$ | $NA_7$, $NA_5$ | $NB_7$, $NA_1$ | 5/⅕ |
| 9 | 33 | $NA_3$, $NA_1$ | $NA_7$, $NA_3$ | $NB_7$, $NA_1$ | 7/⅐ |
| 10 | 33 | $NA_3$, $NA_1$ | $NA_7$, $NA_1$ | $NB_7$, $NA_1$ | 9/⅑ |

1) One-Stage SC Converters:

They are composed of only one of the basic structures. The conversion gain M of this converter is directly corresponding to the gain of the adopted SC structure N.

Figure 19A:
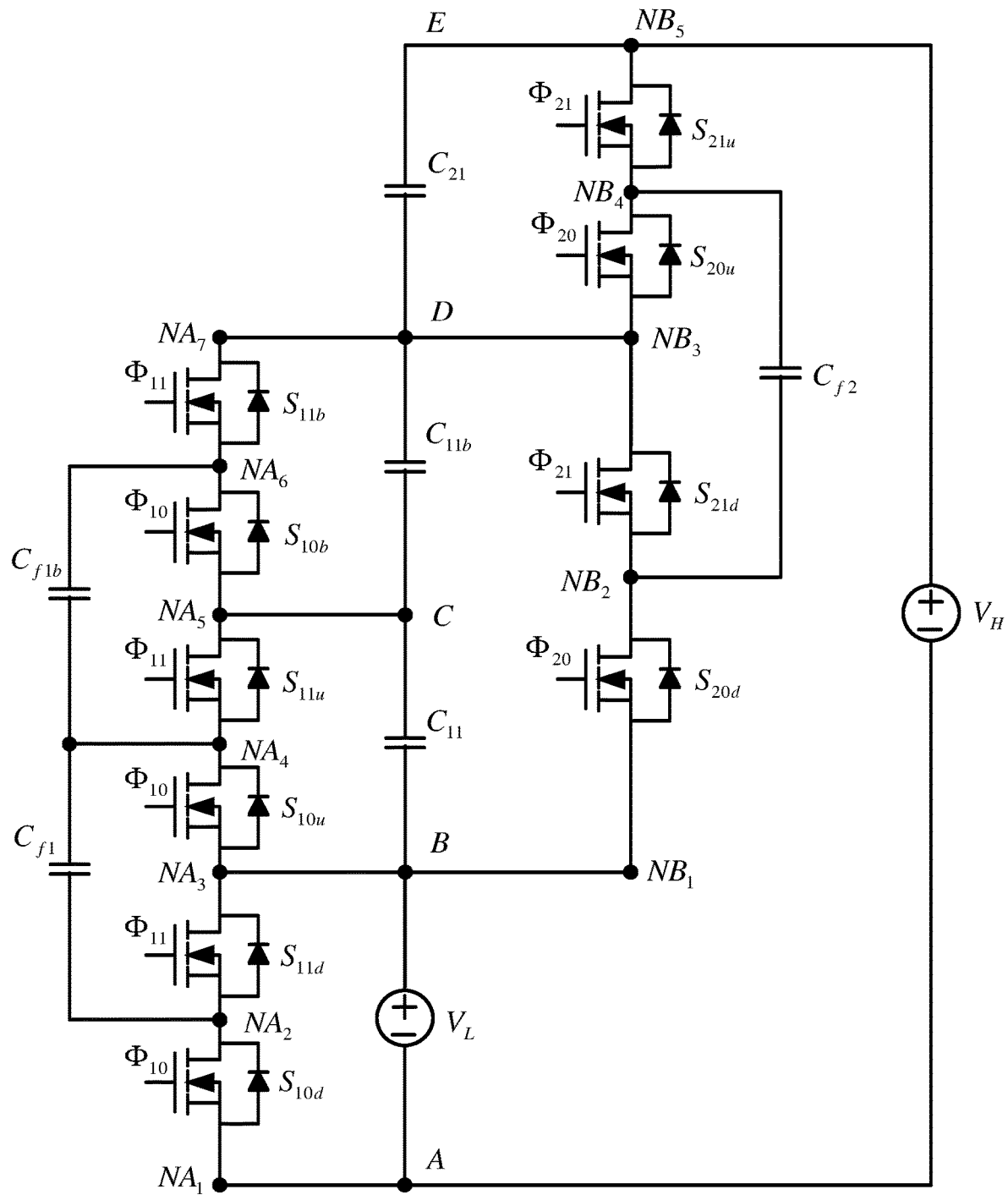
FIG. 19(a) is a schematic diagram of a five-time bidirectional SC converter in accordance with an embodiment of the present invention.

2) Two-Stage SC Converters:

They are composed of two basic structures. Hence, there are four possible combinations for any two particular types of SC structures. For example, a two-time SC structure plus a three-time SC structure gives the following combinations: 22, 23, 32, and 33, where the first number represents the basic structure the first-stage used, and the second number represents the basic structure of the second-stage used. There are different ways of connecting the second-stage structure to the first-stage structure even with the same basic structures, which results in a different conversion ratio. Table I shows the various possible combinations of the two-stage SC converters for a two-time plus three-time SC structure combination. Please note that $NX_y$ (refer to FIG. 9(a)) represents the y node of the X stage, where A represents the first stage, B represents the second stage, and so on. For example, in the case of Type 6 combination with a 32 combination as given in Table I, the first-stage is a three-time SC structure and the second stage is a two-time SC structure, where nodes $NA_3$ and $NA_1$ of the first-stage three-time structure are respectively connected to the positive and ground of the input voltage source. The nodes $NA_7$ and $NA_3$ of this structure are respectively connected to $NB_3$ and $NB_1$, which are the input nodes of the second-stage two-time SC structure. The output of the converter is obtained from $NB_5$ (positive potential) and $NA_1$ (ground), where gives equivalently the output $V_H$. FIG. 19(a) shows the overall circuit connection of this converter, which is a five-time bidirectional SC converter. Here, the three-time bidirectional SC structure, which is the first-stage structure of the converters, will firstly step up the input voltage to three times the value. The input of the second-stage two-time bidirectional SC structure is connected to nodes $NA_7$ and $NA_3$, such that the input of the second-stage is ⅔ the output of the first-stage structure, i.e., $2V_L$. Since the second-stage SC structure doubles its input voltage, its output voltage will be $4V_L$. This output, which is in series connection with the input power source, forms a five-time output voltage $5V_L$. In the case of reversing the operation to step down mode, the output will be $$\frac{1}{5}V_H.$$

Similarly, the operations of all other SC converters with different conversion ratios can be deduced using same approach. FIG. 20 shows various six-time to nine-time bidirectional SC converters configured using the two-time and three-time SC structures.

3) Three-Stage SC Converters:

They are composed of a cascade of three basic structures. The detail to this is omitted in this document as the approach is similar to that given in the case of two-stage SC converters, as depicted in Table I.

D. Operation of m-Time and $$\frac{1}{m}\text{-time}$$

Bidirectional SC Converters

This section discusses the switching operations of the m-time bidirectional SC converter using the five-time bidirectional SC converter in the step-up mode operation as an illustration.

Figure 19B:
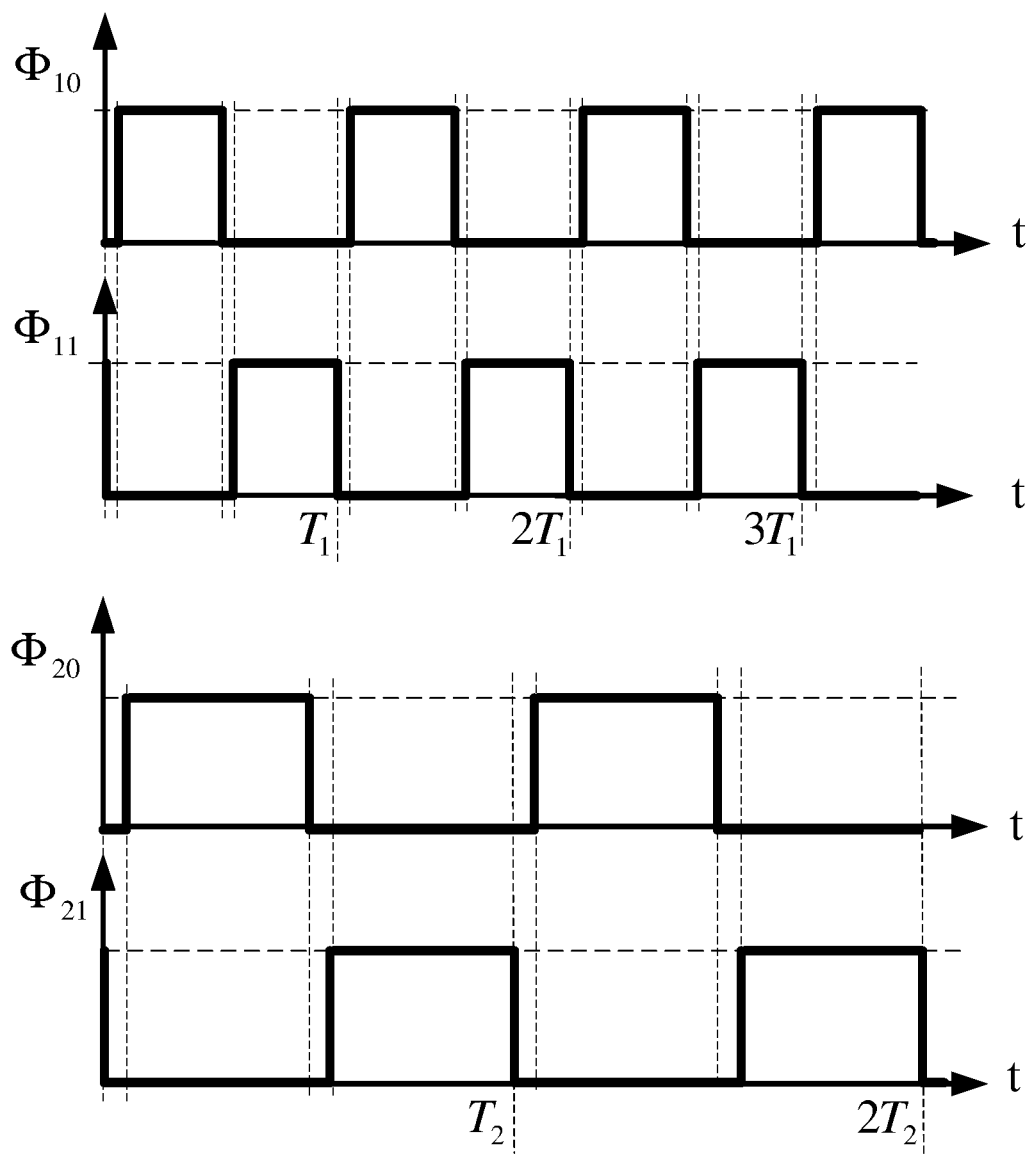
FIG. 19(b) are timing diagrams of the SC converter shown in FIG. 19(a)
Figure 20A:
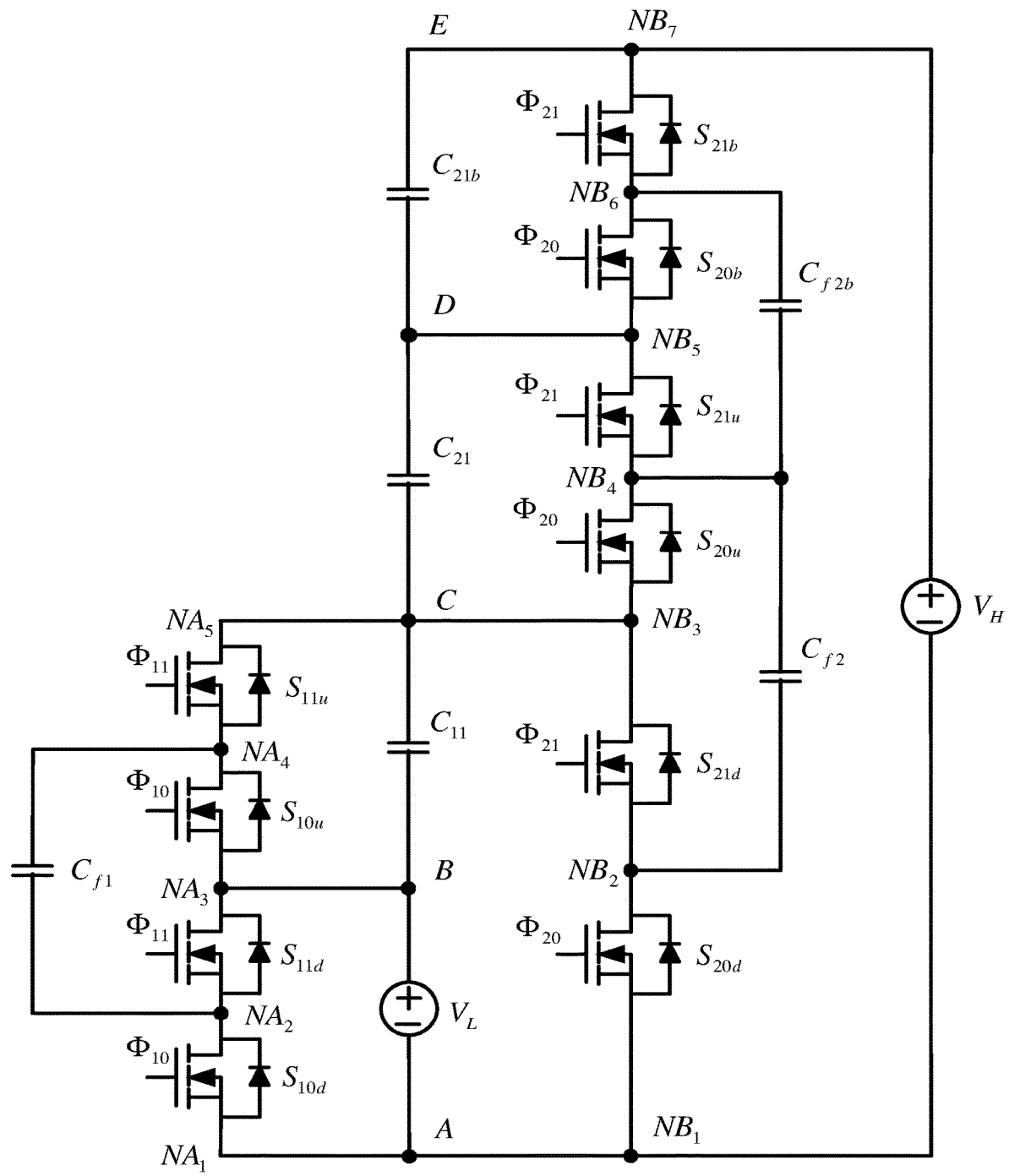
FIG. 20(a) is a schematic diagram of a six-time bidirectional SC converter in accordance with an embodiment of the present invention.
Figure 20B:
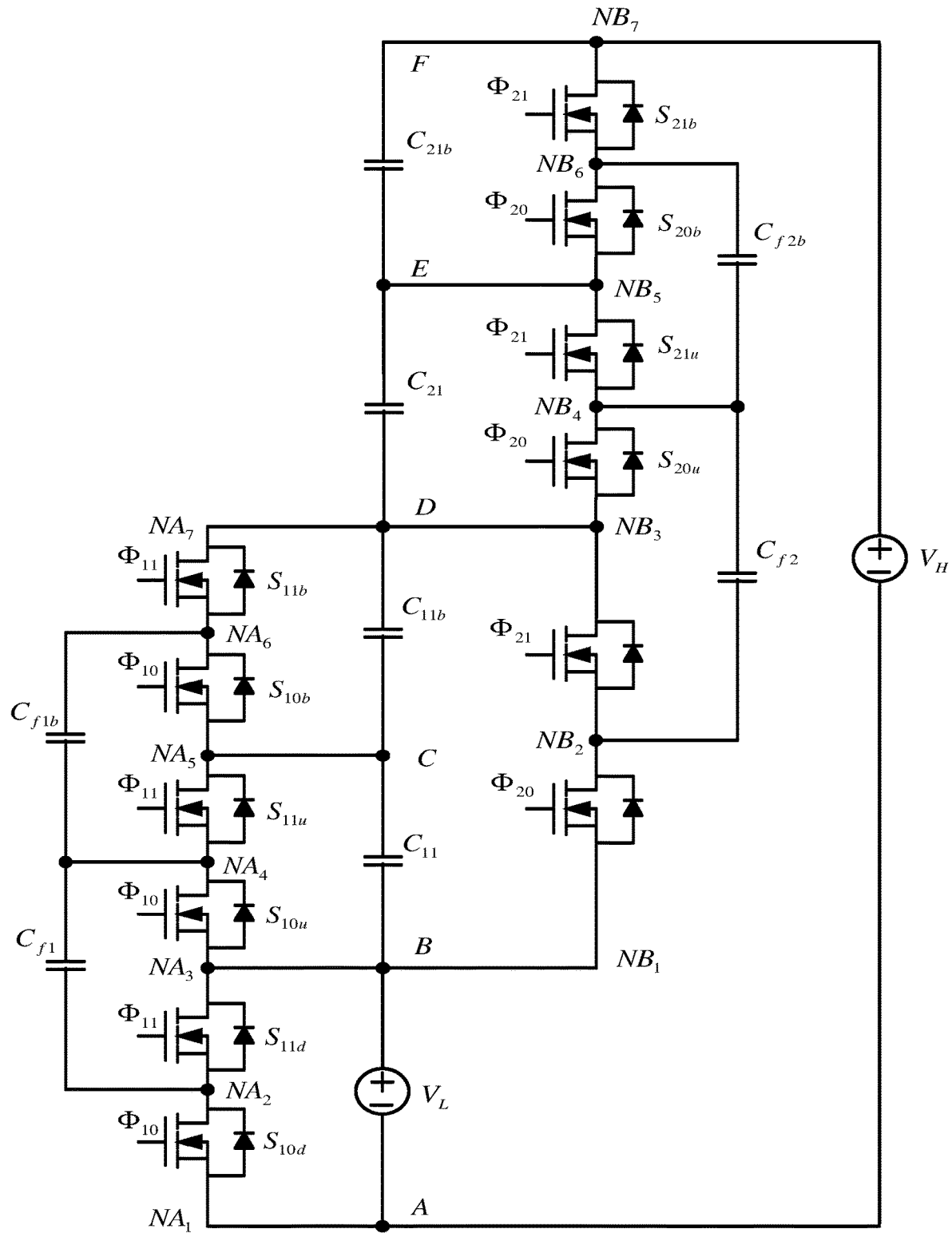
FIG. 20(b) is a schematic diagram of a seven-time bidirectional SC converter in accordance with an embodiment of the present invention.
Figure 20C:
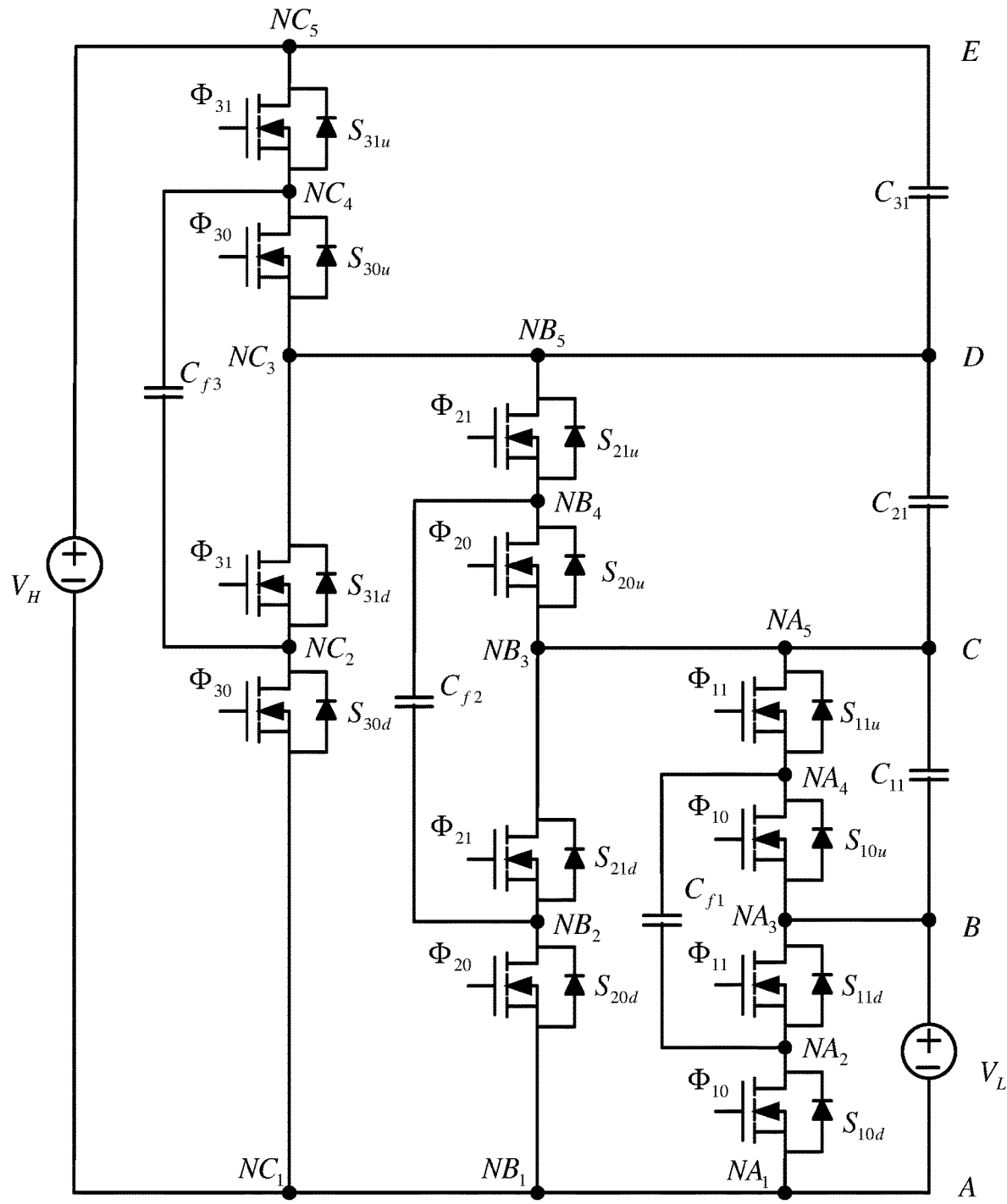
FIG. 20(c) is a schematic diagram of an eight-time bidirectional SC converter in accordance with an embodiment of the present invention.
Figure 20D:
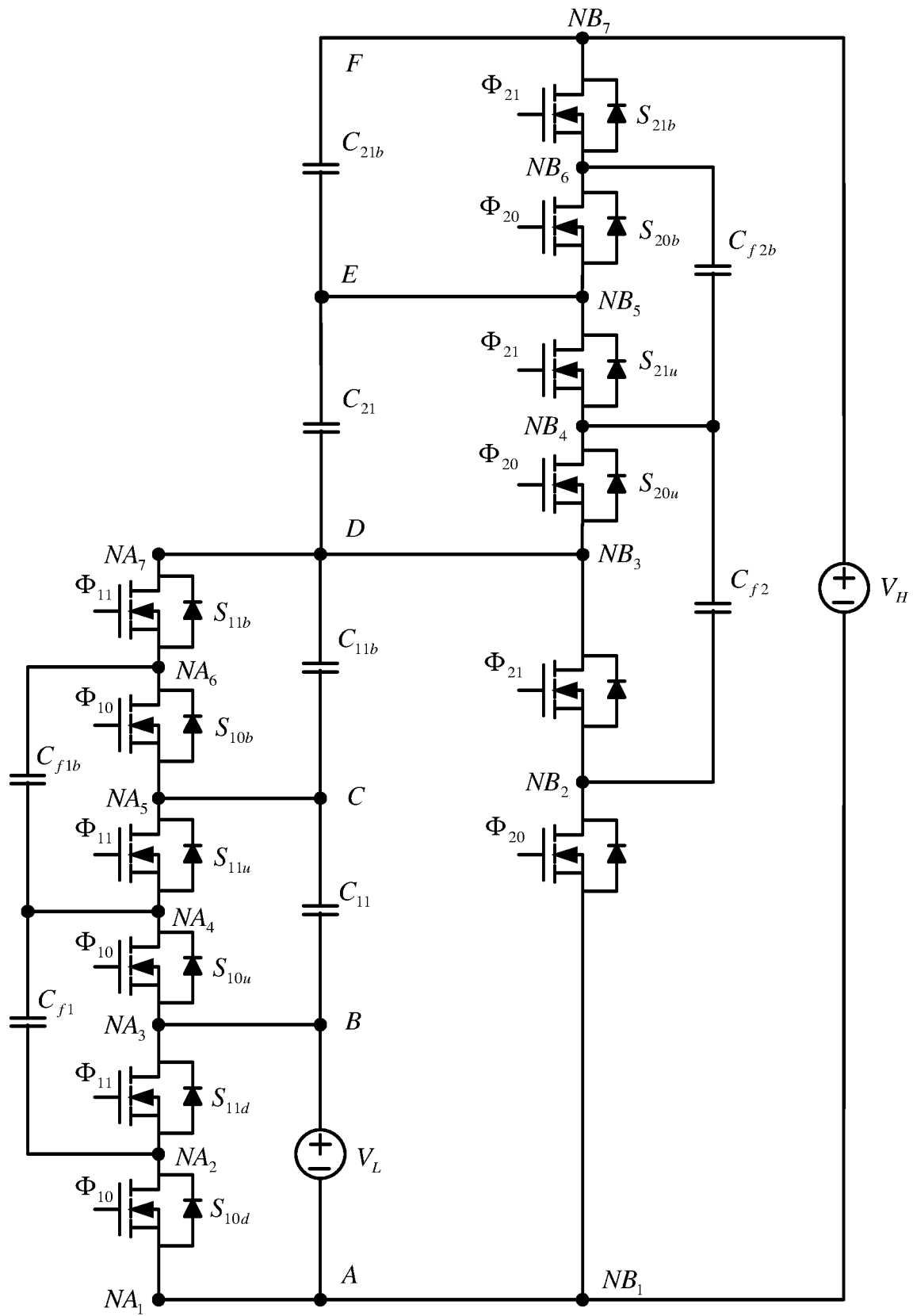
FIG. 20(d) is a schematic diagram of a nine-time bidirectional SC converter in accordance with an embodiment of the present invention.

According to the timing diagram shown in FIG. 19(b), there are four main states of operation (ignoring the dead-time period), which are shown in FIG. 21. In State 1, switches $S_{10u}$, $S_{10d}$, and $S_{10b}$ are ON, switches $S_{11u}$, $S_{11d}$, and $S_{11b}$ are OFF, and the flying capacitors $C_{f1}$, and $C_{f1b}$ are paralleled to the power source and the bypass capacitor $C_{11}$, respectively. Simultaneously, switches $S_{20u}$, and $S_{20d}$ are ON, switches $S_{20u}$, and $S_{20d}$ are OFF, and the flying capacitor $C_{f2}$ is paralleled to the two series connected bypass capacitors $C_{11}$, and $C_{11b}$. In State 2, switches $S_{20u}$, $S_{20d}$, and $S_{10b}$ are OFF, switches $S_{11u}$, $S_{11d}$, and $S_{11b}$ are ON, and the flying capacitors $C_{f1}$, and $C_{f1b}$ are paralleled to the two bypass capacitors $C_{11}$, and $C_{11b}$, respectively. Concurrently, switches $S_{20u}$, and $S_{20d}$ are ON, switches $S_{20u}$, and $S_{20d}$ are OFF, and the flying capacitor $C_{f2}$ is paralleled to the two series-connected bypass capacitors $C_{11}$, and $C_{11b}$. In State 3, switches $S_{10u}$, $S_{10d}$, and $S_{10b}$ are ON, switches $S_{11u}$, $S_{11d}$, and $S_{11b}$ are OFF, the flying capacitors $C_{f1}$, and $C_{f1b}$ are paralleled to the power source and the bypass capacitor $C_{11}$, respectively. Also, switches and $S_{20u}$, and $S_{20d}$ are OFF, switches $S_{20u}$, and $S_{20d}$ are ON, the flying capacitor $C_{f2}$ is paralleled to the bypass capacitor $C_{12}$. In State 4, switches $S_{10u}$, $S_{10d}$, and $S_{10b}$ are OFF, switches $S_{11u}$, $S_{11d}$, and $S_{11b}$ are ON, the flying capacitors $C_{f1}$, and $C_{f1b}$ are paralleled to the two bypass capacitors $C_{11}$, and $C_{11b}$, respectively. Concurrently, switches $S_{20u}$, and $S_{20d}$ are OFF, switches $S_{20u}$, and $S_{20d}$ are ON, and the flying capacitor $C_{f2}$ is paralleled to the bypass capacitor $C_{12}$. The switching operation is the same in the case of the step-down mode. However, because the role of the input source and the load are interchanged, the flow of the current will be reversed.

E. $\frac{m}{2}$-time and $\frac{2}{m}$-time

SC Converters

Figure 22B:
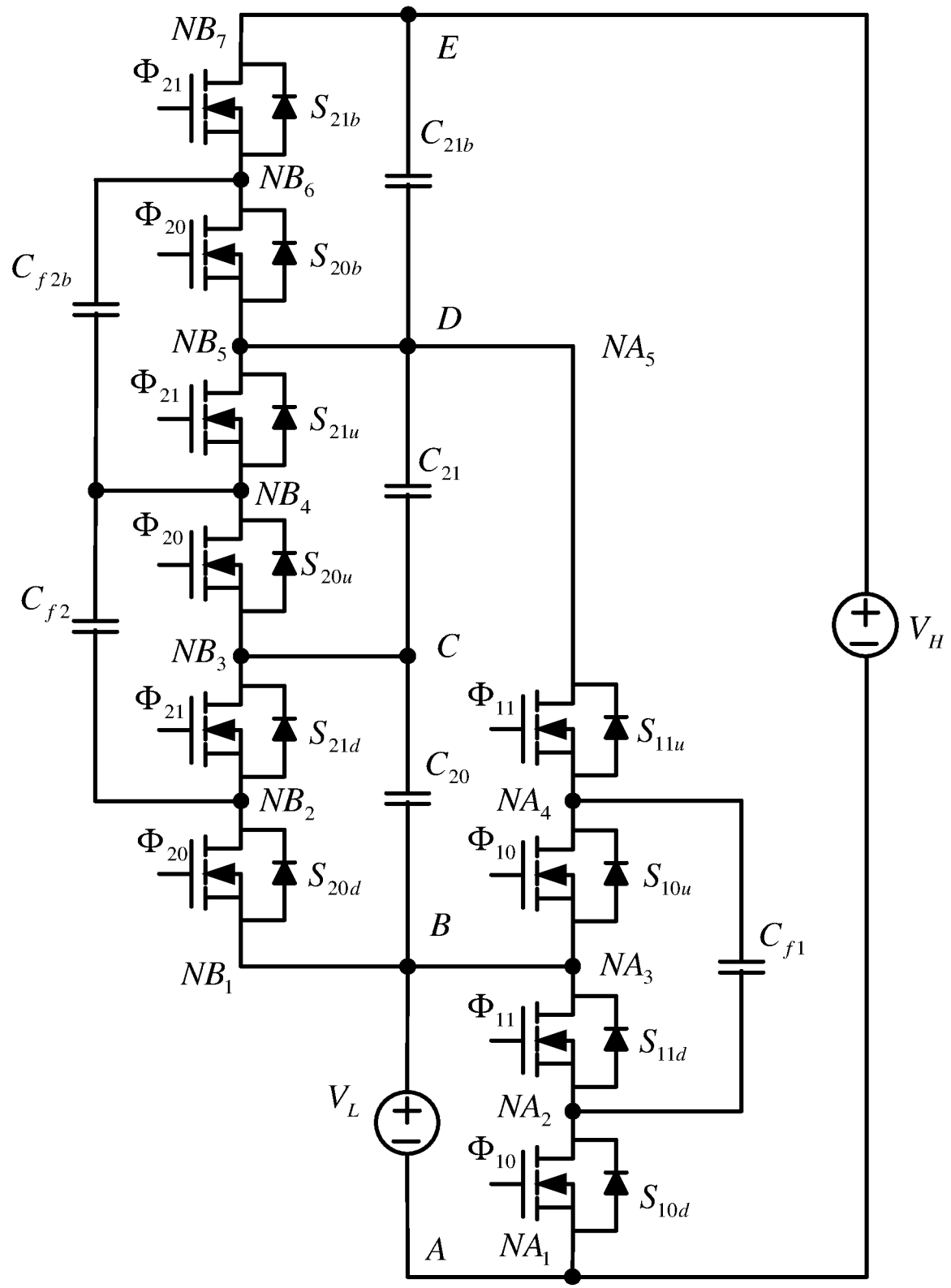
Figure 22C:
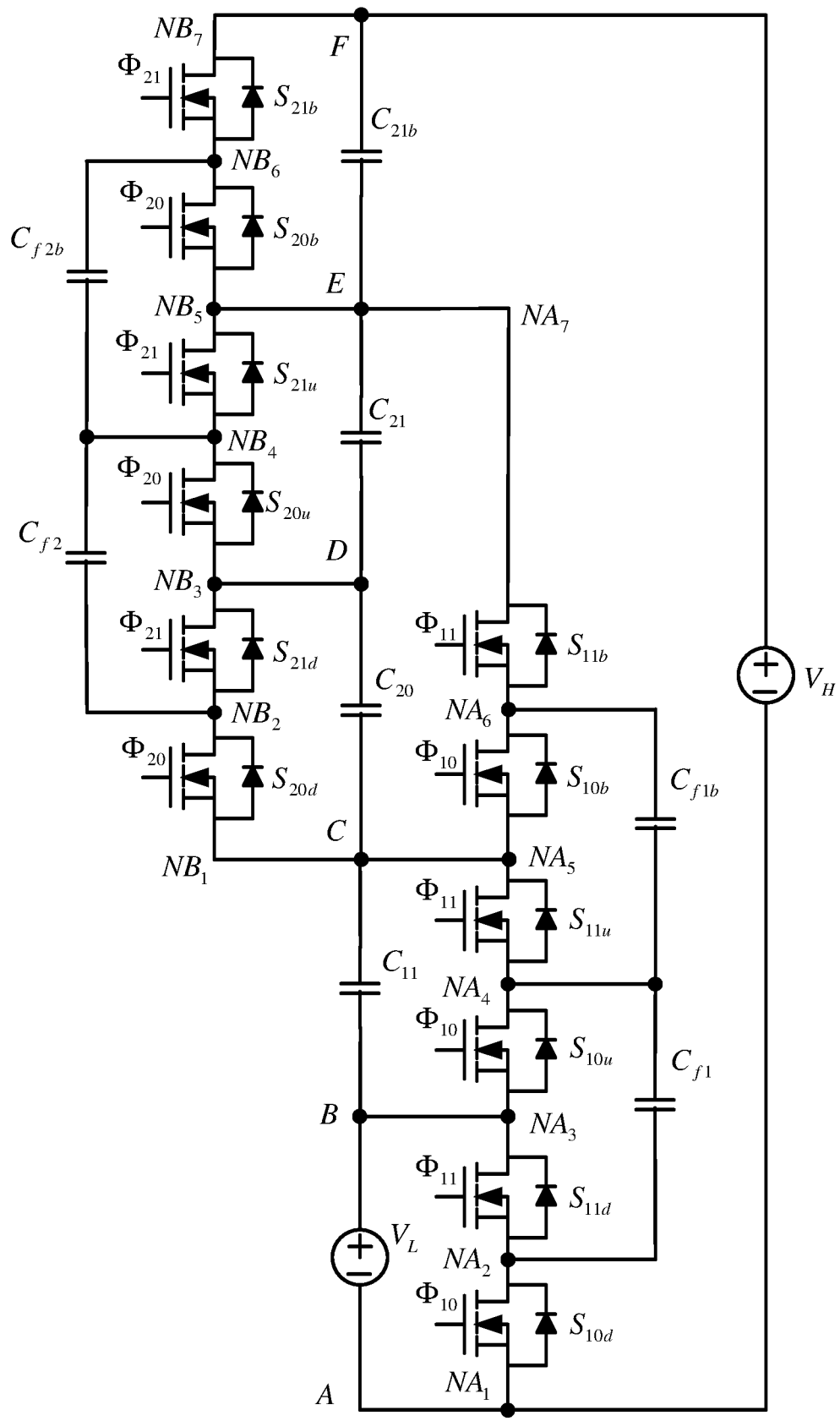

In the previous section, the low voltage side $V_L$ of the first-stage three-time SC structure is connected to nodes $NA_1$, and $NA_3$ and its conversion ratio is 3 for the step-up mode and 1/3 for the step-down mode. Instead, if a capacitor is paralleled to the series-connected switches $S_{10d}$, and $S_{11d}$, and the low voltage side $V_L$ is connected at nodes $NA_1$, and $NA_5$ (as shown in FIG. 22), then the conversion of three-time SC structure becomes 3/2 for the step-up mode and 2/3 for the step-down mode.

With this simple modification, a series of bidirectional SC converters with conversion ratios of $$M = \frac{m}{2}$$

for the step-up mode and $$M = \frac{2}{m}$$

for the step-down mode can be obtained. An example of various SC converters with conversion ratio of (3/2, 2/3), $\left(\frac{3}{2}, \frac{2}{3}\right), \left(\frac{5}{2}, \frac{2}{5}\right), \text{and } \left(\frac{7}{2}, \frac{2}{7}\right)$ and (7/2, 2/7) are shown in FIG. 22.

F. $\frac{n}{m}$-time and $\frac{m}{n}$-time (m<n, and m, and n are Positive Integers) SC Converters (a) Type I: Input and Output are of Common Ground.

In sections III-C and III-E, SC converters with m-time and $\frac{m}{2}$-time time are introduced. In these two series of SC converters, the low side voltage are all connected to nodes A and B of the converters (refer to FIGS. 20 and 22). If a capacitor is connected to nodes A and B instead of the low voltage side $V_L$, while $V_L$ is connected to the common ground A and any of the other nodes B, C, . . . , etc., a conversion ratio of $M = \frac{m}{n} \text{ or } M = \frac{n}{m}$ can be achieved. Table II gives an example of such bidirectional SC converters with M=5 and M=7.

TABLE II

Figure 21A:
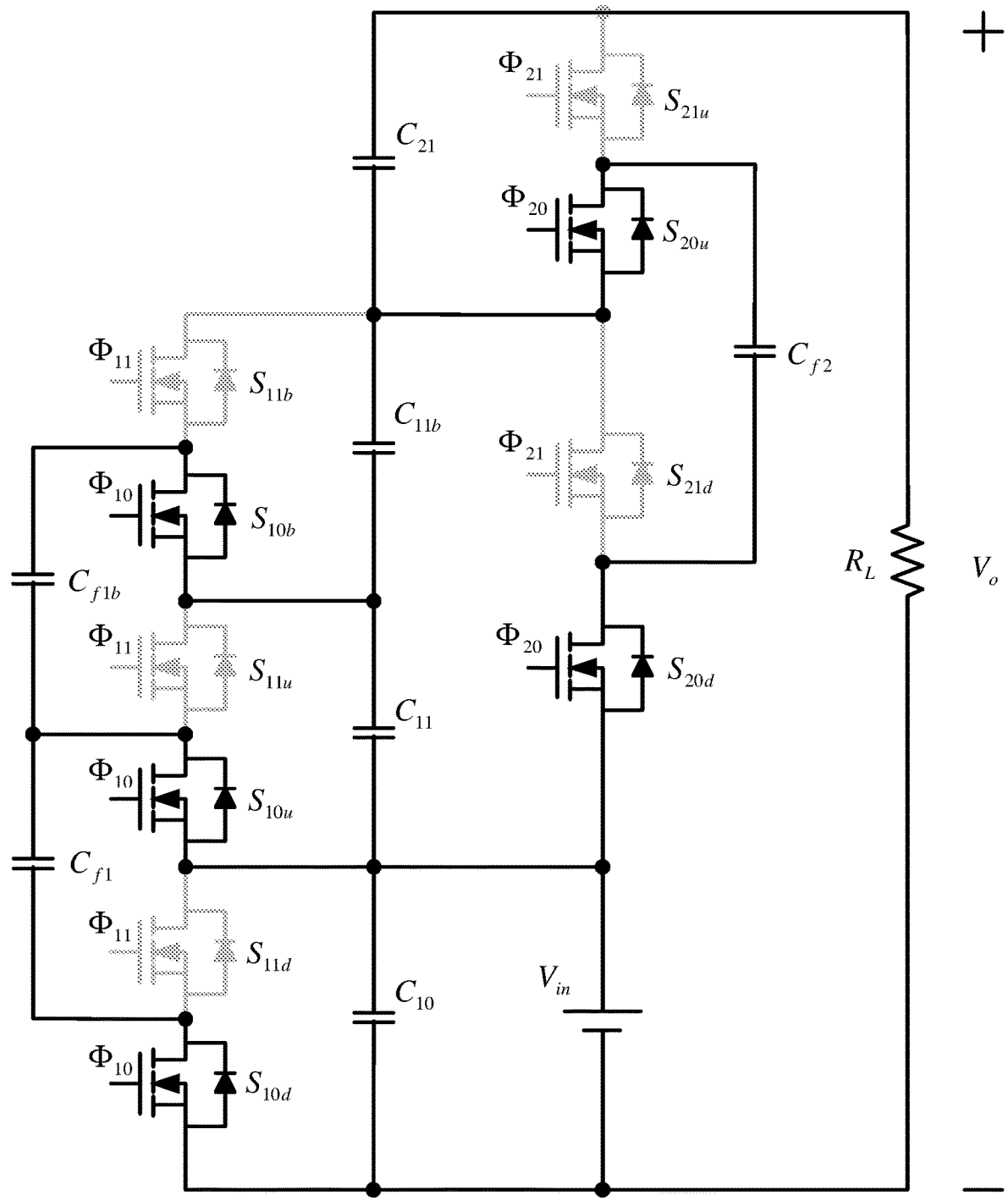
FIG. 21(a) to (d) are schematic diagrams of a five-time bidirectional SC converter in accordance with an embodiment of the present invention, showing four main operating states of a step-up mode of operation.
Figure 21B:
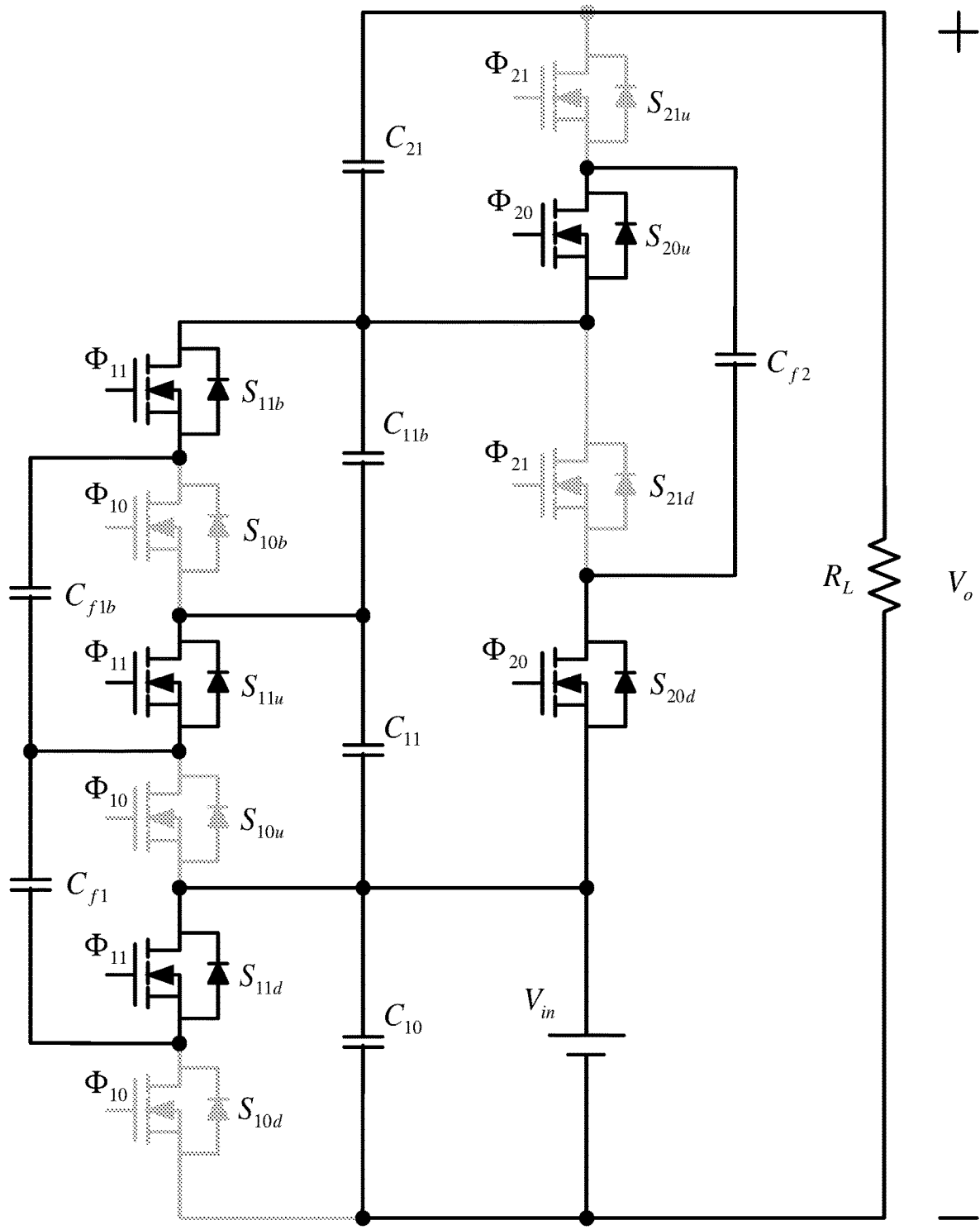

| | $\frac{m}{n}$ type SC converters | | | | | | |
|---|---|---|---|---|---|---|---|
| FIG. | $V_L$ | $V_H$ | Conversion ratio | FIG. | $V_L$ | $V_H$ | Conversion ratio (M) |
| FIG. 18(a) | A, B | A, E | 1/5 | FIG. 21(b) | A, B | A, E | 2/5 |
| N = 5 | A, C | A, E | 2/5 | N = 5 | A, C | A, E | 3/5 |
| | A, D | A, E | 3/5 | | A, D | A, E | 4/5 |

TABLE II-continued

Figure 21C:
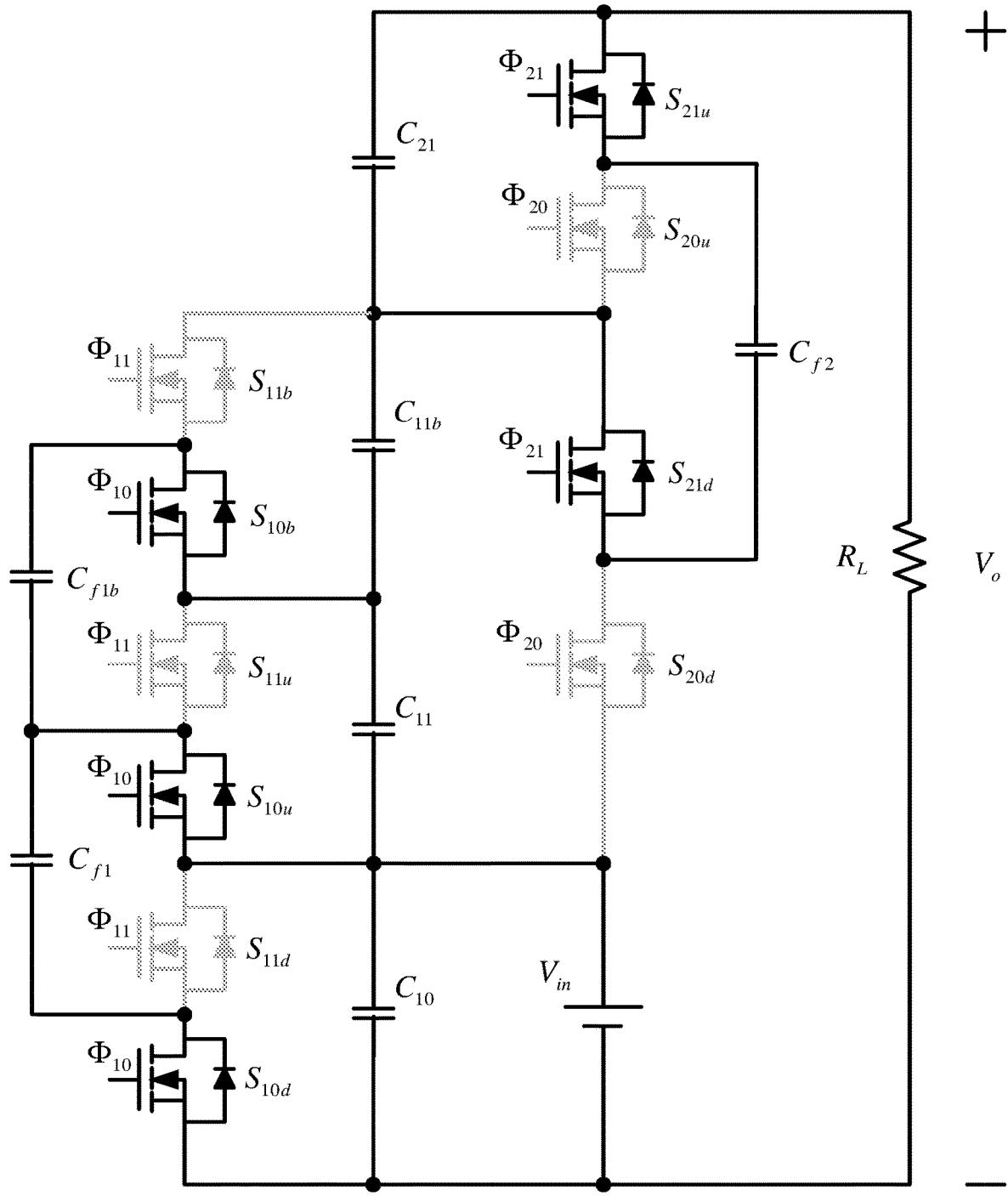
Figure 21D:
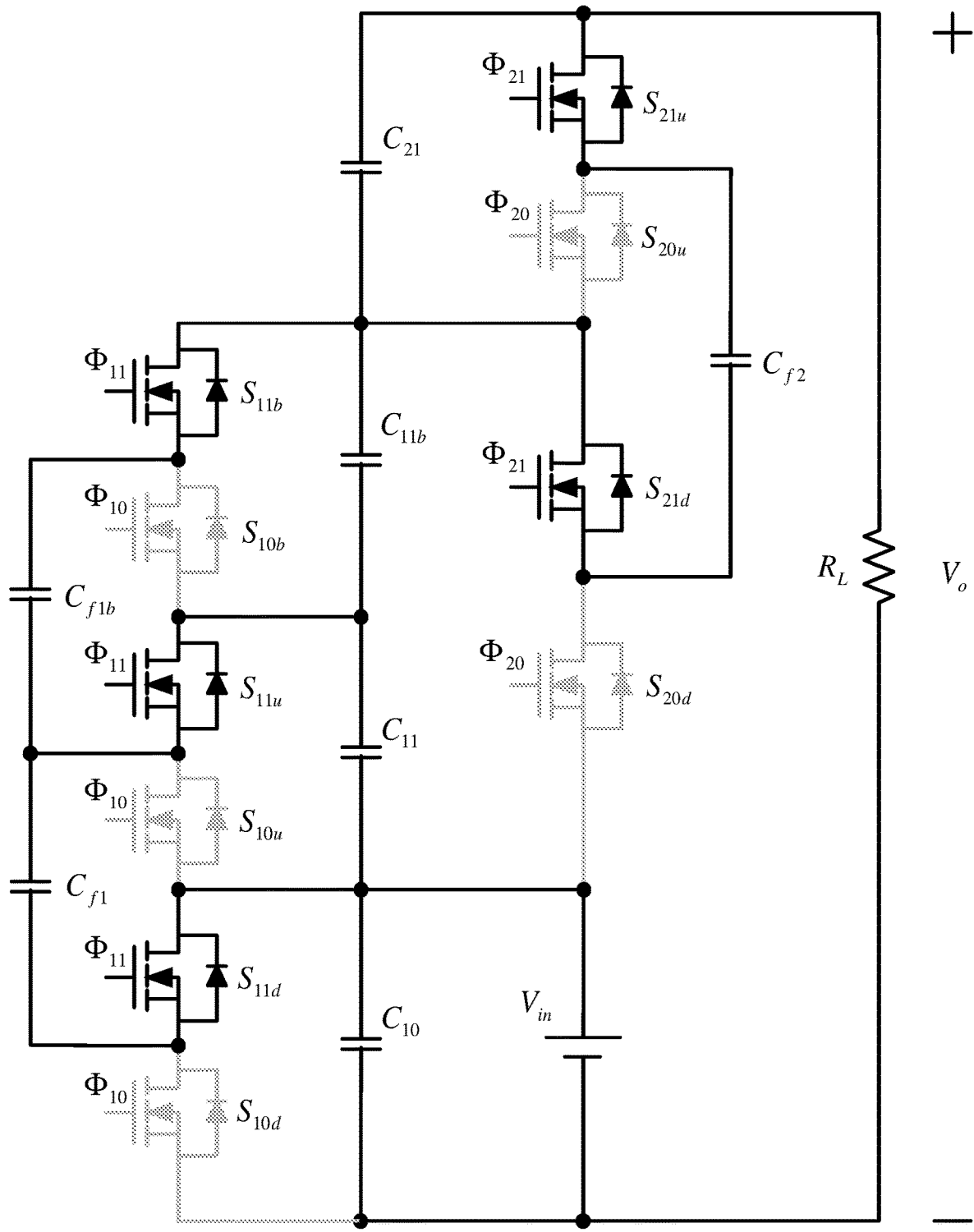

| | $\frac{m}{n}$ type SC converters | | | | | | |
|---|---|---|---|---|---|---|---|
| FIG. | $V_L$ | $V_H$ | Conversion ratio | FIG. | $V_L$ | $V_H$ | Conversion ratio (M) |
| FIG. 19(b) | A, B | A, F | 1/7 | FIG. 21(c) | A, B | A, F | 2/7 |
| N = 7 | A, C | A, F | 2/7 | N = 7 | A, C | A, F | 4/7 |
| | A, D | A, F | 3/7 | | A, D | A, F | 5/7 |
| | A, E | A, F | 5/7 | | A, E | A, F | 6/7 |

(b) Type II: Input and Output are not of Common Ground.

If the input of the bidirectional SC converter described above is connected to any of the two nodes of B, C, . . . , etc., and the output is the stack of the bypass capacitors, an SC converter without common ground and with conversion ratio $M = \frac{m}{n} \text{ or } M = \frac{n}{m},$ can be obtained.

G. Reconfigurable SC Converters

Figure 23:
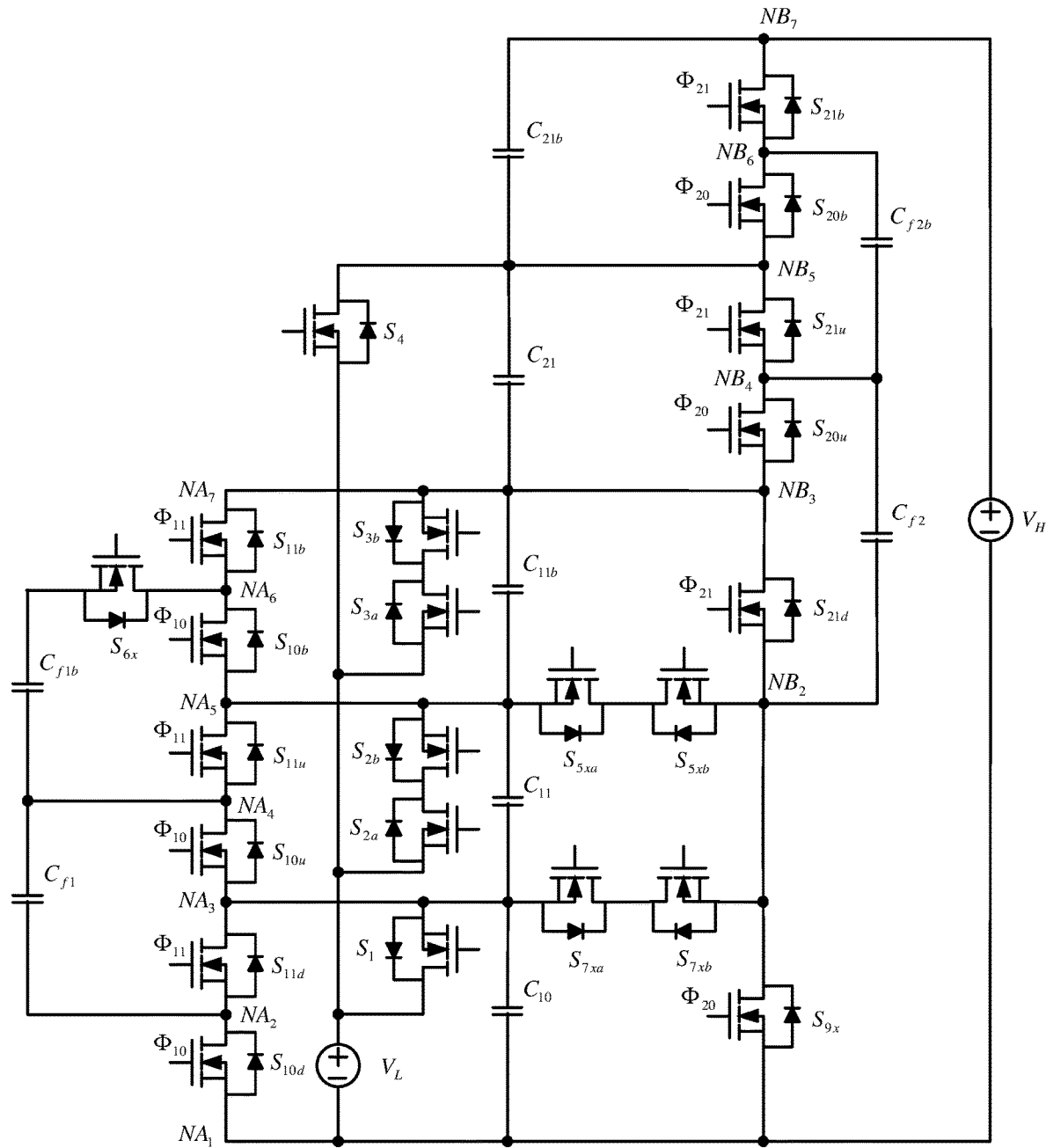

Previous sections have illustrated many series of SC converters with conversion ratio of $M = \frac{m}{n} \text{ or } M = \frac{n}{m},$ depending on the direction of the power flow. From the illustrations, these converters are composed of two or more units of the two-time and/or three-time SC structures. It is possible to convert these converters into reconfigurable converters with variable conversion gain M that can be changed in real time through control by introducing some additional switches to these converters. For example, FIG. 23 shows two reconfigurable SC converters based on the SC topology shown in FIG. 20(d). For the converters shown in FIG. 23(a), five extra switches have been added as compared with the converter shown in FIG. 20(d) to achieve a variable ratio. Table. III shows the operating states of the switches for different conversion ratios, where ($\Phi_{10}$, $\Phi_{11}$) and ($\Phi_{20}$, $\Phi_{21}$) are two pairs of complementary signals with dead-time.

TABLE III

Conversion ratio of reconfigurable SC converters of topology shown in FIG. 23(a)

| | Conversion ratio (M) | | | | | | | |
|---|---|---|---|---|---|---|---|---|
| Switch | 1 | 2 | 3 | 4 | 5 | 6 | 7 | 9 |
| $S_{5xa}$ | OFF | OFF | OFF | OFF | $\Phi_{20}$ | OFF | OFF | OFF |
| $S_{5xb}$ | OFF | OFF | OFF | OFF | ON or $\Phi_{20}$ | OFF | OFF | OFF |
| $S_{6x}$ | OFF | OFF | ON | OFF | ON | OFF | ON | ON |
| $S_{7xa}$ | OFF | OFF | OFF | $\Phi_{20}$ | OFF | OFF | $\Phi_{20}$ | OFF |
| $S_{7xb}$ | OFF | OFF | OFF | ON or $\Phi_{20}$ | OFF | OFF | ON or $\Phi_{20}$ | OFF |
| $S_{9x}$ | OFF | OFF | OFF | OFF | OFF | $\Phi_{20}$ | OFF | $\Phi_{20}$ |
| $S_{10d}$ | OFF | $\Phi_{10}$ | $\Phi_{10}$ | $\Phi_{10}$ | $\Phi_{10}$ | $\Phi_{10}$ | $\Phi_{10}$ | $\Phi_{10}$ |
| $S_{10a}$ | ON | $\Phi_{10}$ | $\Phi_{10}$ | $\Phi_{10}$ | $\Phi_{10}$ | $\Phi_{10}$ | $\Phi_{10}$ | $\Phi_{10}$ |
| $S_{10b}$ | ON | ON | $\Phi_{10}$ | ON | $\Phi_{10}$ | ON | $\Phi_{10}$ | $\Phi_{10}$ |
| $S_{11d}$ | OFF | $\Phi_{11}$ | $\Phi_{11}$ | $\Phi_{11}$ | $\Phi_{11}$ | $\Phi_{11}$ | $\Phi_{11}$ | $\Phi_{11}$ |
| $S_{11a}$ | ON | $\Phi_{11}$ | $\Phi_{11}$ | $\Phi_{11}$ | $\Phi_{11}$ | $\Phi_{11}$ | $\Phi_{11}$ | $\Phi_{11}$ |
| $S_{11b}$ | ON | ON | $\Phi_{11}$ | ON | $\Phi_{11}$ | ON | $\Phi_{11}$ | $\Phi_{11}$ |
| $S_{20a}$ | ON | ON | ON | $\Phi_{20}$ | $\Phi_{20}$ | $\Phi_{20}$ | $\Phi_{20}$ | $\Phi_{20}$ |
| $S_{20b}$ | ON | ON | ON | $\Phi_{20}$ | $\Phi_{20}$ | $\Phi_{20}$ | $\Phi_{20}$ | $\Phi_{20}$ |

TABLE III-continued

Conversion ratio of reconfigurable SC converters of topology shown in FIG. 23(a)

| Switch | Conversion ratio (M) | | | | | | | |
|---|---|---|---|---|---|---|---|---|
| | 1 | 2 | 3 | 4 | 5 | 6 | 7 | 9 |
| $S_{21d}$ | OFF | OFF | OFF | $\Phi_{21}$ | $\Phi_{21}$ | $\Phi_{21}$ | $\Phi_{21}$ | $\Phi_{21}$ |
| $S_{21a}$ | ON | ON | ON | $\Phi_{21}$ | $\Phi_{21}$ | $\Phi_{21}$ | $\Phi_{21}$ | $\Phi_{21}$ |
| $S_{21b}$ | ON | ON | ON | $\Phi_{21}$ | $\Phi_{21}$ | $\Phi_{21}$ | $\Phi_{21}$ | $\Phi_{21}$ |

It is further possible to have four additional groups of switches, namely, ($S_1$), ($S_{2a}$, $S_{2b}$), ($S_{3a}$, $S_{3b}$), and ($S_4$), and a capacitor $C_{10}$ introduced to the SC converter in FIG. 23(a) for enhanced reconfiguration of the input voltage $V_L$ such that it can be flexibly connected to different Y nodes of the SC structures through control. A diagram of the resulted converter is shown in FIG. 23(b). Only one out of the four groups of switches is kept 'ON' for selecting a particular input node. Different possible conversion ratios exist for the turning on of each group of switches, and the conversion ratio is shown in Table IV. In particular, note that this converter can achieve a new type of reconfigurable fractional conversion operation where real-time conversion of varying voltage gain can be achieved. An SC converter of this nature was never reported in any literature. The possibility of achieving such fractional conversion allows output voltage near a desired voltage to be obtained for any input voltage source using the SC converter. By adopting a linear regulator in cascade with this SC converter, a well-regulated DC output voltage with high efficiency and very fast response, and without any magnetics, is achievable for any input voltage source.

TABLE IV

Conversion ratio of reconfigurable SC converters

| NO. | Configuration type | $S_1$ 'ON' | $S_{2a}$, $S_{2b}$ 'ON' | $S_{3a}$, $S_{3b}$ 'ON' | $S_4$ 'ON' |
|---|---|---|---|---|---|
| 1 | 1x | 1 | 1 | 1 | 1 |
| 2 | 2x | 2, 1/2 | 1 | 1 | 1 |
| 3 | 3x | 3, 1/3 | 3/2, 2/3 | 1 | 1 |
| 4 | 4x | 4, 1/4 | 2, 1/2 | 2, 1/2 | 4/3, 3/4 |
| 5 | 5x | 5, 1/5 | 5/2, 2/5 | 5/3, 3/5 | 5/4, 4/5 |
| 6 | 6x | 6, 1/6 | 3, 1/3 | 3, 1/3 | 3/2, 2/3 |
| 7 | 7x | 7, 1/7 | 7/2, 2/7 | 7/3, 3/7 | 7/5, 5/7 |
| 8 | 9x | 9, 1/9 | 9/2, 2/9 | 3, 1/3 | 3/2, 2/3 |

H. AC-AC SC Converters

If the MOSFET switches of the converters discussed in the previous sections are replaced by bidirectional switches, a series of SC converters that achieve AC-AC conversion can be derived.

Possible Applications

There are two critical application areas for such bidirectional SC converters, which are the high-voltage-gain step-up conversion for distributed energy resources and in low power IC electronic applications. In distributed energy resources applications, it is required that the converter is of high-voltage-conversion ratio, high efficiency, and functional in high temperature environment, which are the key features of the proposed SC converters. On the other hand, the proposed SC converters have other attractive merits such as using fewer switches and capacitors, having lower voltage stress, and a simple control as compared to other types of SC converters. Also, as the converter is only composed of switches and capacitors, it is easy to fabricate it into an IC in the case of low power applications.

Advantages Over Prior Power Converters

Although patent [24] proposed a high-voltage-gain SC converter by using the basic structure of the two-time SC structure, their method of achieving high-voltage-gain conversion is restricted to simply cascading multiples of the two-time SC structure. The conversion ratio of their patented converter and approach must be $$M = 2^N \text{ or } M = \frac{1}{2^N}$$

(where N is integer). In our invention, the method of configuring the SC converter is based on an N-time SC structure and is not limited to the two-time SC structure. The idea is to combine one or multiple of SC structures to get an SC converter with a flexible conversion ratio, like $$M = \frac{m}{n},$$

etc., and it is not fixed at $2^M$ or $$\frac{1}{2^N}.$$

Patent [27] proposed an SC converter which uses the three-time SC structure. However, this patent is focused on the two-stage multi-output converter, in which the second stage is an inductor based step-down DC-DC converter.

Patents [26], [28]-[30] proposed various types of reconfiguration SC converters. However, they are all of different topologies as compared to that proposed in this invention.

Variants

It can be appreciated that the aforesaid embodiments are only exemplary embodiments adopted to describe the principles of the present invention, and the present invention is not merely limited thereto. Various variants and modifications may be made by those of ordinary skill in the art without departing from the spirit and essence of the present invention, and these variants and modifications are also covered within the scope of the present invention. Accordingly, although the invention has been described with reference to specific examples, it can be appreciated by those skilled in the art that the invention can be embodied in many other forms. It can also be appreciated by those skilled in the art that the features of the various examples described can be combined in other combinations.

CITATIONS

[1] http://www.erec.org/media/publications/2040-scenario.html.

[2] W. C. Li, X. Xiang, C. Li, W. H. Li, and X. N. He, "Interleaved high step-up ZVT converter with built-in transformer voltage doubler cell for distributed PV generation system," IEEE Trans. on Pow. Electron., vol. 28, no. 1, pp. 300-313, January 2013.

[3] Y.-M. Chen, A. Q. Huang, and X. W. Yu, "A high step-up three-port DC-DC converter for stand-alone PV/battery power systems," IEEE Trans. on Pow. Electron., vol. 28, no. 11, pp. 5049-5062, November 2013.

[4] I. Laird and D. D.-C. Lu, "High step-up DC-DC topology and MPPT algorithm for use with a thermoelectric generator," IEEE Trans. on Pow. Electron., vol. 28, no. 7, pp. 3147-3157, July 2013.

[5] L. Barreto, P. Praca, D. Oliveira, R. Silva, "High-voltage gain boost converter based on 3-state commutation cell for battery charging using PV panels in a single conversion stage," IEEE Trans. on Pow. Electron., vol. 29, no. 1, pp. 150-158, January 2014.

[6] W. H. Li and X. N. He, "Review of non-isolated high-step-up DC-DC converters in photovoltaic grid-connected applications," IEEE Trans. on Indust. Electron., vol. 58, no. 4, pp. 1239-1250, April 2011.

[7] K. I. Hwu and Y. T. Yau, "An interleaved AC-DC converter based on current tracking," IEEE Trans. on Indust. Electron., vol. 56, no. 5, pp. 1456-1463, May 2009.

[8] G. Franceschini, E. Lorenzani, M. Cavatorta, and A. Bellini, "3boost: a high-power three-phase step-up full-bridge converter for automotive applications," IEEE Trans. on Indust. Electron., vol. 55, no. 1, pp. 173-183, January 2008.

[9] C. M. Stein, J. R. Pinheiro, and H. L. Hey, "A ZCT auxiliary commutation circuit for interleaved boost converters operating in critical conduction mode," IEEE Trans. on Pow. Electron., vol. 17, no. 6, pp. 954-962, November 2002.

[10] J. M. Kwon and B. H. Kwon, "High step-up active-clamp converter with input-current doubler and output-voltage doubler for fuel cell power systems," IEEE Trans. on Pow. Electron., vol. 24, no. 1, pp. 108-115, January 2009.

[11] L. Zhu, "A novel soft-commutating isolated boost full-bridge ZVS-PWM DC-DC converter for bidirectional high power applications," IEEE Trans. on Pow. Electron., vol. 21, no. 2, pp. 422-429, March 2006.

[12] C. Yoon, J. Kim, and S. Choi, "Multiphase DC-DC converters using a boost-half-bridge cell for high-voltage and high power applications," IEEE Trans. on Pow. Electron., vol. 26, no. 2, pp. 381-388, February 2011.

[13] R. Wai and R. Duan, "High-efficiency high-voltage difference ratio bi-directional converter," U.S. Pat. No. 7,382,113B2.

[14] C. Leu, J. Lin, and S. Wu, "High voltage gain power converter," U.S. Pat. No. 8,199,5402B 2.

[15] T. Liang, J. Chen, K. Tseng, and S. Chen, "Multi-winding high step-up DC-DC converter," US patent no. US2011/0292690A1

[16] F. Peng, M. L. Gebben, B. Ge, "A compact nX DCDC converter for photovoltaic power systems," in proceeding of IEEE Energ. Cony. Cong. and Expo. (ECCE), pp. 4780-4784, September 2013.

[17] Y. Tezuka, H. Kumamoto, Y. Saito, F. Ueno, and T. Inoue, "A low power DC-DC converter using a switched-capacitor transformer," in Proceedings of Inter. Tele. Energ. Conf. (INTELEC), pp. 261-268, October 1983.

[18] B. Oraw and R. Ayyanar, "Load adaptive, high efficiency, switched capacitor intermediate bus converter," in Proceedings of Inter. Tele. Energ. Conf. (INTELEC), pp. 628-635, October 2007.

[19] R. H. Dennard, B. L. Ji, and R. K. Montoye, "Switched capacitor voltage converters," U.S. Pat. No. 8,248,152B2.

[20] M. S. Makowski and D. Maksimovic, "Performance limits of switched-capacitor DCDC converters," in Proceedings of IEEE Pow. Elect. Spec. Conf. (PESC), vol. 2, pp. 1215-1221, June 1995.

[21] A. Kushnerov and S. Ben-Yaakov, "Algebraic synthesis of Fibonacci switched capacitor converters," in Proceedings of IEEE Inter. Conf. on Microw., Comm., Ant. and Elect. Sys. (COMCAS), pp. 1-4, November 2011.

[22] T. Umeno, K. Takahashi, I. Oota, F. Ueno, and T. Inoue, "New switched-capacitor DCDC converter with low input current ripple and its hybridization," in Proceedings 33rd IEEE Midwest Symp. on Cir. and Sys. (MWSCS), pp. 1091-1094, August 1990.

[23] S. Xiong, S. C. Wong, S.-C. Tan, and C. K. Tse, "A family of exponential step-down switched-capacitor converters and their applications in two-stage converters," IEEE Trans. on Pow. Electron., vol. 29, no. 4, pp. 1870-1880, April 2014.

[24] M. Xu, J. Sun, and F. C. Lee, "Non-isolated bus converter with voltage divider topology," US patent no. US2007/0296383.

[25] R. Jain, "A novel switched capacitor circuit for efficient voltage regulation," in Proceedings 7th Int. Carib. Conf. on Devi., Cir. And Sys. (ICCDCS), pp. 1-6, April 2008.

[26] R. Jain, "Switched Capacitor voltage regulator having multiple conversion ratios," U.S. Pat. No. 8,089,788B2.

[27] B. S. Oraw and P. Kumar, "Switched-capacitor converters," US patent no. U.S. Pat. No. 7,696,735B2.

[28] S. Ben-Yaakov and M. Shashoua, "Self-adjusting switched-capacitor converters and target voltage ratios," U.S. Pat. No. 8,259,476B2.

[29] S. Marisili, W. Hoellinger, and G. Maderbacher, "Programmable switch for switched capacitor DCDC converter," US patent no. US2013/0106375A1.

[30] D. S. Repley and H. Liu, "Voltage conversion method in a continuously variable switched capacitor voltage converter," U.S. Pat. No. 8,537,579B2.

The invention claimed is:

1. A power converter comprising:
one or more switch blocks each having:
a plurality of switch-pairs each having two switches connected in series to each other;
a plurality of primary nodes each interconnecting the switches in a respective switch-pair; and
a plurality of secondary nodes, each switch-pair being connected in series to an adjacent switch-pair through a respective secondary node to form a serial chain of switch-pairs;
each adjacent pair of the primary nodes connectable to a flying capacitor; and
each pair of the secondary nodes connectable to one or more of the following: at least one of a plurality of bypass capacitors, and one or more of the switch blocks;
the power converter further comprising:
a low voltage side and a high voltage side, the low voltage side having a first terminal directly connected to both a first secondary node of the secondary nodes and a first terminal of a first bypass capacitor of the plurality of bypass capacitors, and a second terminal directly connected to both a second secondary node of the secondary nodes and a second terminal of the high voltage side; and the high voltage side having a first terminal directly connected to both a first terminal of a second bypass capacitor of the plurality of bypass capacitors and a third secondary node of the secondary nodes, and the second terminal directly connected to the second terminal of the low voltage side and the second secondary node of the secondary nodes;

wherein the power converter is a bidirectional switched-capacitor (SC) converter, wherein one of the low voltage side and the high voltage side is configured to be connected to a power source, and the other of the low voltage side and the high voltage side is configured to be connected to a load, wherein the power source and the load are interchangeable to each other, wherein the power source and the load are directly connected to the last secondary node, wherein the flying capacitor is not connected to an inductor, wherein the power converter is absent both an input capacitor filter connected to the power source in parallel and an output capacitor filter connected to the load in parallel, and wherein each switch-pair has a first switch and a second switch connected in series to each other, wherein the power converter is operated in two operating states and in the two operating states, the flying capacitor is alternately in parallel with the low voltage side and the first bypass capacitor wherein timing durations of an ON state of each of the first switches are equal to one another and equal to timing durations of an ON state of each corresponding second switch of the switch-pairs.

2. The power converter according to claim 1 comprising a plurality of the switch blocks, one defining a first-stage switch block and the others defining ith-stage switch blocks (i=2, 3, . . . , n, wherein n is the last switch block) with two secondary nodes of each ith-stage switch block connected to two secondary nodes of one or more earlier stage switch blocks.

3. The power converter according to claim 2 wherein the low voltage side is connected to the first secondary node of the first-stage switch block and a second secondary node of any switch block other than the first-stage switch block.

4. The power converter according to claim 3 wherein the high voltage side is connected to a secondary node of the first-stage switch block and to a secondary node of the nth-stage switch block.

5. The power converter according to claim 3 comprising two of the switch blocks, one defining a first-stage switch block and the other defining a second-stage switch block with two secondary nodes of the second-stage switch block connected to two secondary nodes of the first-stage switch block.

6. The power converter according to claim 3 configured to convert a first voltage at the low voltage side to a second voltage at the high voltage side at a desired conversion ratio.

7. The power converter according to claim 2 wherein the low voltage side is connected to any one of the secondary nodes of any of the switch block and any one of the remaining secondary nodes of any of the switch block.

8. The power converter according to claim 7 wherein the high voltage side is connected to a secondary node of the first-stage switch block and to a secondary node of the nth-stage switch block.

9. The power converter according to claim 7 comprising two of the switch blocks, one defining a first-stage switch block and the other defining a second-stage switch block with two secondary nodes of the second-stage switch block connected to two secondary nodes of the first-stage switch block.

10. The power converter according to claim 7 configured to convert a first voltage at the low voltage side to a second voltage at the high voltage side at a desired conversion ratio.

11. The power converter according to claim 2 wherein the high voltage side is connected to a secondary node of the first-stage switch block and to a secondary node of the ith-stage switch block.

12. The power converter according to claim 11 comprising two of the switch blocks, one defining a first-stage switch block and the other defining a second-stage switch block with two secondary nodes of the second-stage switch block connected to two secondary nodes of the first-stage switch block.

13. The power converter according to claim 11 configured to convert a first voltage at the low voltage side to a second voltage at the high voltage side at a desired conversion ratio.

14. The power converter according to claim 2 comprising two of the switch blocks, one defining the first-stage switch block and the other defining a second-stage switch block with two secondary nodes of the second-stage switch block connected to two secondary nodes of the first-stage switch block.

15. The power converter according to claim 14 comprising a third switch block defining a third-stage switch block with two secondary nodes of the third-stage switch block connected to two secondary nodes of the second-stage switch block.

16. The power converter according to claim 15 configured to convert a first voltage at the low voltage side to a second voltage at the high voltage side at a desired conversion ratio.

17. The power converter according to claim 14 comprising a third switch block defining a third-stage switch block with one secondary node of the third-stage switch block connected to one secondary node of the second-stage switch block and another secondary node of the third-stage switch block connected to one secondary node of the first-stage switch block.

18. The power converter according to claim 17 configured to convert a first voltage at the low voltage side to a second voltage at the high voltage side at a desired conversion ratio.

19. The power converter according to claim 14 configured to convert a first voltage at the low voltage side to a second voltage at the high voltage side at a desired conversion ratio.

20. The power converter according to claim 2 configured to convert a first voltage at the low voltage side to a second voltage at the high voltage side at a desired conversion ratio.

21. The power converter according to claim 2, wherein the high voltage side is connected to any one of the secondary nodes of any of the switch block and any one of the remaining secondary nodes of any of the switch block.

22. The power converter according to claim 1 configured to convert a first voltage at the low voltage side to a second voltage at the high voltage side at a desired integral conversion ratio.

23. The power converter according to claim 22 wherein the conversion ratio is fractional.

24. The power converter according to claim 23 comprising one or more reconfiguration switches connected to one or more switch blocks such that the conversion ratio is variable in real-time, the power converter thereby being reconfigurable.

25. The power converter according to claim 22 comprising one or more reconfiguration switches connected to one or more switch blocks such that the conversion ratio is variable in real-time, the power converter thereby being reconfigurable.

26. The power converter according to claim 1, wherein the bypass capacitor is connected between one secondary node that forms the serial chain and the first secondary node, and is not connected between the one secondary node that forms the serial chain and the last secondary node.

* * * * *